(12) United States Patent
Wirola et al.

(10) Patent No.: US 9,560,534 B2
(45) Date of Patent: Jan. 31, 2017

(54) PROCESSING OBJECTS OF A RADIOMAP DATABASE

(75) Inventors: Lauri Aarne Johannes Wirola, Tampere (FI); Tommi Antero Laine, Tampere (FI); Mikko Juhani Blomqvist, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 706 days.

(21) Appl. No.: 13/642,782

(22) PCT Filed: Apr. 27, 2010

(86) PCT No.: PCT/IB2010/051831
§ 371 (c)(1),
(2), (4) Date: Jan. 4, 2013

(87) PCT Pub. No.: WO2011/135406
PCT Pub. Date: Nov. 3, 2011

(65) Prior Publication Data
US 2013/0143593 A1   Jun. 6, 2013

(51) Int. Cl.
| | |
|---|---|
| H04W 36/00 | (2009.01) |
| H04W 4/00 | (2009.01) |
| H04W 24/00 | (2009.01) |
| G01S 5/02 | (2010.01) |
| H04W 4/02 | (2009.01) |
| H04W 64/00 | (2009.01) |

(52) U.S. Cl.
CPC ............ *H04W 24/00* (2013.01); *G01S 5/0252* (2013.01); *H04W 4/02* (2013.01); *H04W 64/003* (2013.01)

(58) Field of Classification Search
CPC ... G01S 5/0252; H04W 24/00; H04W 64/003; H04W 4/02–4/08

USPC .......... 455/466, 456.3, 456.1–457; 707/101, 707/202; 709/223
See application file for complete search history.

(56) References Cited

U.S. PATENT DOCUMENTS 5,960,436 A * 9/1999 Chang et al.
6,636,742 B1 * 10/2003 Torkki ................. H04W 60/00
                                                                 455/433

(Continued)

FOREIGN PATENT DOCUMENTS

| EP | 1302783 | 4/2003 |
|---|---|---|
| WO | WO2006031035 | 3/2006 |
| WO | WO2006135542 | 12/2006 |

OTHER PUBLICATIONS

International Search Report for International Application No. PCT/IB2010/051831—Date of Completion of Search: Jan. 5, 2011, 4 pages.

*Primary Examiner* — San Htun
(74) *Attorney, Agent, or Firm* — Locke Lord LLP

(57) ABSTRACT

It is inter alia disclosed to respectively link at least two objects of a plurality of objects to one or more respective regions of a grid of regions. The at least two objects are respectively related to a respective coverage area representation and/or a respective coverage-providing entity. At least two of the at least two objects are associated with each other based on a finding that both have been linked to at least one same region of the grid of regions. At least one of the at least two associated objects is an object related to a first communication system and at least one other of the at least two associated objects is an object related to a second communication system that is different from and/or operated by another operator than said first communication system.

21 Claims, 10 Drawing Sheets

(56) References Cited

U.S. PATENT DOCUMENTS

| | | |
|---|---|---|
| 2003/0129990 A1 | 7/2003 | Gorsuch et al. |
| 2003/0129992 A1 | 7/2003 | Koorapaty et al. |
| 2004/0198397 A1* | 10/2004 | Weiss .......................... 455/456.5 |
| 2005/0113123 A1* | 5/2005 | Torvinen ........................ 455/519 |
| 2007/0060150 A1* | 3/2007 | Hart .............................. 455/446 |
| 2008/0057955 A1* | 3/2008 | Choi-Grogan .......... H04W 8/04 |
| | | 455/435.1 |
| 2009/0104907 A1* | 4/2009 | Otting ................... H04W 48/10 |
| | | 455/435.3 |
| 2010/0056181 A1* | 3/2010 | Rippon et al. ............. 455/456.3 |
| 2011/0177826 A1* | 7/2011 | Huang ................. H04W 64/00 |
| | | 455/456.1 |

\* cited by examiner

PROCESSING OBJECTS OF A RADIOMAP DATABASE

FIELD

Embodiments of this invention relate to the field of positioning, in particular to positioning that is based on the knowledge of positions of coverage-providing entities and/or on representations of coverage areas.

BACKGROUND

As an alternative or add-on to satellite-based positioning systems, positioning systems in which a present position of a terminal is estimated based on a list of Coverage-Providing Entities (CPEs) (such as for instance base stations of a cellular Communication System (CS), or Wireless Local Area Network (WLAN) Access Points (APs)) that can presently be "heard" by the terminal and a database that contains identifiers and positions of the CPEs and/or models for their coverage areas (e.g. elliptical models) have gained recent interest. Therein, a terminal may for instance be considered to "hear" a CPE if it is able to receive one or more signals (e.g. a broadcast channel), which are sent by the CPE, with a pre-defined minimum quality (for instance defined in terms of a signal-to-noise ratio or a signal-to-noise and interference ratio), or if the terminal is capable of at least partially receiving and correctly decoding one or more signals sent by the CPE (e.g. a broadcast channel), or if the terminal is able to receive and correctly decode a CPE identifier (for instance a Medium Access Control (MAC) address or another identifier). The information which communication nodes a terminal can hear may for instance result from a scanning/sniffing operation performed by the terminal.

For instance, given that the positions of the heard CPEs are known and distances from the terminal to the heard CPEs can be estimated, the terminal's position can be estimated through triangulation. The distance between a terminal and the heard CPEs can for instance be estimated based on the path loss using a channel model (i.e. how much the signal attenuates between the terminal and the CPE) or based on timing (or round-trip timing) measurements (i.e. information expressing how long signals propagate between terminal and CPE).

Alternatively, if coverage area models of CPEs are known, a terminal may pick the coverage area models for the heard CPEs and find the intersection of these coverage area models. The terminal can then be assigned a position that is, for instance, the center-of-mass of the intersection area. Similarly an error estimate for the position estimate can be given, for example, based on the size of the intersection.

SUMMARY OF SOME EMBODIMENTS OF THE INVENTION

CPE positions and/or coverage area models may for instance be stored in a database of a server, for instance together with respective CPE identifiers. From this server, a terminal may for instance retrieve information on CPE positions and/or coverage area models together with respective CPE identifiers. This information may then for instance be locally stored in a database of the terminal for actual and/or future positioning.

However, there may exist situations where a terminal is capable of hearing CPEs of at least a first CS and a second CS (for instance CPEs of a cellular CS and CPEs of a non-cellular (e.g. WLAN) CS; or CPEs of two CSs that are operated by different operators). Combining information of CPE positions and/or coverage models that relate to such different or differently operated CSs for joint usage by a terminal in positioning is generally desirable, since accuracy of positioning may increase with the number of CPE positions and/or coverage area models available for positioning.

However, consider for instance a case where a terminal is capable of hearing CPEs of both a cellular and a non-cellular CS, and requests from the server information on CPE positions/coverage area models of both CSs for positioning purposes. If the terminal specifies its request in terms of a Location Area Code (LAC) of the cellular CS, it has to be noted that there exists no link between the CPE positions/coverage area models of the cellular CS, which are identified by the LAC (for instance due to a hierarchic structure of the cellular CS), and the CPE positions/coverage area models of the non-cellular CS. Thus if CPE positions/coverage area models of both CSs shall be provided by the server to the terminal, such a linkage has to be performed. One solution to accomplish this is to determine intersections between the CPE positions/coverage area models of the cellular CS that have been identified by the LAC, and the CPE positions/coverage area models of the non-cellular CS. With increasing numbers of CPE positions/coverage models, this determining may become a computationally burdensome and (in case of limited hardware capabilities) slow task.

A similar situation may arise in a case where a terminal is capable of hearing CPEs of at least two CSs that are operated by different operators. Specifying a request in terms of an LAC of a CS operated by a first operator only identifies the CPEs of this operator, but not the CPEs of another operator.

Furthermore, to represent the links between CPE positions/coverage area models of different CSs in a database, for instance two-way pointers may be used (i.e. there is a pointer linking a first CPE position/coverage area model of a first CS to a second CPE position/coverage area model of a second CS and vice versa). These pointers consume a vast amount of storage space, in particular in case of several different CSs. Furthermore, the pointer-based concept furthermore necessitates recalculation of intersections and determining/adapting of the pointers each time a new CPE position/coverage area model is added or changed.

An embodiment of a method according to a first aspect of the invention thus comprises:
respectively linking at least two objects of a plurality of objects to one or more respective regions of a grid of regions, wherein the at least two objects are respectively related to at least one of a respective Coverage Area Representation (CAR) and a respective CPE, and
associating at least two of the at least two objects with each other based on a finding that both have been linked to at least one same region of the grid of regions, wherein at least one of the at least two associated objects is an object related to a first CS and at least one other of the at least two associated objects is an object related to a second CS that is at least one of different from and operated by another operator than the first CS.

This embodiment of a method may for instance be performed by an apparatus.

An embodiment of an apparatus according to the first aspect of the invention is configured to realize or comprises means for realizing at least the operations of the embodiment of the method according to the first aspect of the invention presented above.

The means of this apparatus can be implemented in hardware and/or software. They may comprise for instance a processor for executing program code for realizing the required functions, a memory storing the program code, or both. Alternatively, they could comprise for instance a circuitry that is designed to realize the required functions, for instance implemented in a chipset or a chip, like an integrated circuit. Further alternatively, the means could be functional modules of a computer program code.

Another embodiment of an apparatus according to the first aspect of the invention comprises at least one processor and at least one memory including computer program code, the at least one memory and the computer program code configured to, with the at least one processor, cause the apparatus at least to perform the operations of the embodiment of the method according to the first aspect of the invention presented above. The computer program code included in the memory may for instance at least partially represent software and/or firmware for the processor. Non-limiting examples of the memory are a RAM or ROM that is accessible by the processor.

In these embodiments, the apparatus may for instance be a server. It may for instance comprise a database for storing the objects of the plurality of objects. The apparatus may for instance be configured to provide information to other apparatuses, for instance to an apparatus according to the second aspect of the invention. This provision of information may for instance be accomplished under at least partial usage of a CS, which may for instance be based on wireless and/or wire-bound transmission. The apparatus may further comprise a network interface for connecting the apparatus to a network, such as for instance an Internet-Protocol (IP)-based network. The network may for instance be part of the CS or may be used to connect the apparatus to an interfacing unit (for instance a gateway) of the CS.

An embodiment of a computer program according to the first aspect of the invention comprises program code for performing at least the operations of the embodiment of the method according to the first aspect of the invention presented above when the computer program is executed on a processor.

An embodiment of a method according to a second aspect of the invention comprises receiving information on at least two associated objects obtained by respectively linking at least two objects of a plurality of objects to one or more respective regions of a grid of regions and by associating at least two of the at least two objects with each other based on a finding that both have been linked to at least one same region of a grid of regions, wherein the at least two objects are respectively related to at least one of a respective CAR and a respective CPE, and wherein at least one of the at least two associated objects is an object related to a first CS and at least one other of the at least two associated objects is an object related to a second CS that is at least one of different from and operated by another operator than the first CS. This embodiment of a method may for instance be performed by an apparatus.

An embodiment of an apparatus according to the second aspect of the invention is configured to realize or comprises means for realizing at least the operations of the embodiment of the method according to the second aspect of the invention presented above. The means of this apparatus can be implemented in hardware and/or software. They may comprise for instance a processor for executing program code for realizing the required functions, a memory storing the program code, or both. Alternatively, they could comprise for instance a circuitry that is designed to realize the required functions, for instance implemented in a chipset or a chip, like an integrated circuit. Further alternatively, the means could be functional modules of a computer program code.

Another embodiment of an apparatus according to the second aspect of the invention comprises at least one processor and at least one memory including computer program code, the at least one memory and the computer program code configured to, with the at least one processor, cause the apparatus at least to perform the operations of the embodiment of the method according to the second aspect of the invention presented above. The computer program code included in the memory may for instance at least partially represent software and/or firmware for the processor. Non-limiting examples of the memory are a RAM or ROM that is accessible by the processor.

In these embodiments, the apparatus may for instance be a terminal, for instance a terminal that is capable of operating in one or more CSs. The CSs may for instance comprise wireless and/or wire-bound CSs. The CSs may for instance comprise cellular and non-cellular CSs. The apparatus may for instance be configured to use a CS to receive the information, for instance from an apparatus according to the first aspect of the invention.

An embodiment of a computer program according to the second aspect of the invention comprises program code for performing at least the operations of the embodiment of the method according to the second aspect of the invention presented above when the computer program is executed on a processor.

The computer programs according to the first aspect and the second aspect of the invention may for instance be distributable via a network, such as for instance the Internet. The computer programs may for instance at least partially represent software and/or firmware of a processor. The computer programs may for instance be storable and/or encodable in a computer-readable medium. The computer-readable medium may for instance be embodied as an electric, magnetic, electro-magnetic, optic or other storage medium, and may either be a removable medium or a medium that is fixedly installed in an apparatus or device. Non-limiting examples of such a computer-readable medium are a Random-Access Memory (RAM) or a Read-Only Memory (ROM). The computer-readable medium may for instance be a tangible medium, for instance a tangible storage medium. A computer-readable medium is understood to be readable by a computer, such as for instance a processor.

An embodiment of a system according to a third aspect of the invention comprises an apparatus according to the first aspect of the invention and at least one apparatus according to the second aspect of the invention. Therein, the information received by the apparatus according to the second aspect of the invention may have been provided by the apparatus according to the first aspect of the invention. The apparatuses may for instance use a CS provide/receive the information. The CS may be one of the first and/or second CSs, but may equally well be another CS or a CS operated by another operator.

According to the embodiments of all aspects of the invention present above, at least two objects of a plurality of objects are linked to one or more respective regions of a grid of regions. This is performed by an apparatus according to the first aspect of the invention, which may for instance be a server. The plurality of objects may for instance be stored in a database of the apparatus.

At least two of the objects (or even all of the objects of the plurality of objects) are respectively related to a respective CAR and/or a respective CPE. Thus a first of the at least two objects may for instance be related to a CAR, and a second of the at least two objects may for instance be related to a CPE. Equally well, both the first and the second object may be related to respective CPEs or to respective CARs.

Non-limiting examples of CPEs are CPEs of wire-bound or wireless CSs. For instance, a CPE may be a base station of a cellular radio CS, such as for instance a second generation (2G), third generation (3G) or fourth generation (4G) CS, or an AP or beacon of a non-cellular radio CS, such as for instance a WLAN system, a Worldwide Interoperability for Microwave Access (WiMAX) system, a Bluetooth® system, a broadcasting system such as for instance Digital Video Broadcasting (DVB), Digital Audio Broadcasting (DAB) or Frequency-Modulated (FM)/Amplitude-Modulated (AM) radio, a Near Field Communication (NFC) system, etc.).

A CAR represents a coverage area, for instance by means of a model. This model may for instance be a model representing hard boundaries of a coverage area, or a model that represents a coverage area in a statistical sense, for instance by means of a probability (density) function. An example of such a statistical representation of a coverage model is a multi-normal distribution. A CAR may relate to a coverage area provided by a single CPE, but may equally well relate to coverage areas of multiple CPEs. A CAR may for instance relate to a coverage area of an object a Radio Network Controller (RNC) or of a coverage area specified by a Location Area Code (LAC), or even to a coverage area of an operator or country.

Some or all of the at least two objects (or even of all objects of the plurality of objects) may be part of a hierarchical structure. Equally well, some or all of the at least two objects (or even of all objects of the plurality of objects) may not be part of a hierarchical structure. For instance, in case of a 2G system, examples of objects of the plurality of objects are a Mobile Country Code (MCC) object, a Mobile Network Code (MNC) object, a Local Area Code (LAC) object, Cell Identity (CID) object, a neighbour cell object and a base station object. In case of a 3G system, examples of objects are a Mobile Country Code (MCC) object, a Mobile Network Code (MNC) object, a Universal Mobile Telecommunication System (UMTS) Terrestrial Radio Access Network (UTRAN) Cell ID (UC-ID) object (which may comprise an RNC-ID (Radio Network Controller) object and a Cell ID object), a neighbour cell object and a base station object. In case of a 4G system, examples of objects are a Mobile Country Code (MCC) object, a Mobile Network Code (MNC) object, a Long Term Evolution (LTE) Cell Identity object, a neighbour cell object and a base station object. The objects of these 2G, 3G and 4G systems may for instance be considered to be hierarchically structured. In a WLAN system, examples of an object are a Medium Access Control (MAC) address of a WLAN AP. A WLAN system may for instance be considered to lack a hierarchical structure.

The grid of regions may for instance be a grid with rectangular, triangular, hexagonal regions (or cells), to name but a few non-limiting examples, which may for instance be a global grid for referencing locations on the Earth.

The at least two objects of the plurality of objects are linked to one or more respective regions of the grid of regions. Thus for instance a first of the at least two objects may be linked to one region of the grid of regions, and a second of the at least two objects may be linked to more than one regions of the grid of regions, wherein the more than one regions may comprise the one region or not. Equally well, the at least two objects may both be linked to a single respective region (wherein both respective regions may be the same or different), or may both be linked to more than one respective regions (wherein the more than one regions linked to the first object may be different from the more than one regions linked to the second object, or may be partially or entirely the same).

This linkage may for instance be performed before, during or after an object is stored in a database, e.g. in a radiomap database. This linkage may for instance be checked and—if necessary—changed if a change of an object (or a change of a CPE and/or CAR to which an object is related) occurs. Information on respective links between objects and regions may for instance be stored together with information on the objects, for instance by storing respective identifiers of the region or regions linked to each object.

This linkage of objects to regions may be understood as an introduction of an adaptation layer that allows for associating objects linked to at least one same region.

To this end, the embodiments of the invention described above require that at least two of the at least two objects that have been respectively linked to one or more respective regions are associated with each other based on a finding that both have been linked to at least one same region of the grid of regions (there thus exists at least one region that has been at least linked to both objects that are associated). Therein, at least one of the at least two associated objects is an object related to a first CS and at least one other of the at least two associated objects is an object related to a second CS that is at least one of different from and operated by another operator than the first CS.

This associating may for instance be performed when information on one or more objects is requested. As a result of the associating, associated objects are available, and information on these associated objects (such as for instance positions of CPEs and/or CARs related to the associated objects) may for instance be provided to an apparatus according to the second aspect of the invention. Associating objects in response to an actual request may for instance be advantageous since then request/filter parameters contained in the request may be considered, which may further reduce the computational complexity. An example of such request/filter parameters may for instance be that only a specific type of objects (e.g. only objects related to specific CSs) is requested. Alternatively, the association may for instance be performed each time an object is added (e.g. to a database) or updated, or in regular intervals, or in response to other (regular or irregular) events, and may then for instance be performed for all objects in a database (or at least a defined (e.g. pre-defined) subgroup thereof). Information on associated objects may for instance at least temporarily be stored.

For instance, if information on objects of both the first and second CS is requested based on a definition that is related to the first CS only, the objects related to the first communication object may be identified based on the definition, and the objects related to the second CS may be identified based on their association with the identified objects related to the first CS. Therein, the association between the objects may be easily determined for instance by determining all regions to which the objects related to the first CS are linked, and then checking to which of these regions also objects related to the second CS are linked. This may require only small computational resources, since the linkage between a region and an object may for instance be expressed by an identifier of the region (which identifier may for instance be stored together with the object). It is thus not required to calculate intersections between respective CPEs/CARs of objects related to different CSs.

Furthermore, the linkage of objects to one or more regions (rather than to other objects) may require only storage of identifiers of the regions linked to an object, so that storage requirements are independent of the number of CSs of which objects are stored in a database.

Furthermore, the linkage of objects to one or more regions (rather than to other objects) may be particularly flexible in cases where an object (or the CPE(s)/CAR(s) related thereto) changes, since only the link to the one or more regions has to be checked/adapted, whereas the relationship to the objects related to other CSs is not affected.

In a further embodiment of the method according to the first aspect of the invention, the embodiment of the method according to the first aspect of the invention presented above further comprises storing the at least two associated objects with respective links to the at least one same region. The respective links may for instance be embodied as respective identifiers of the at least one same region. The at least two associated objects may for instance be stored in a database, for instance a database of a server.

In a further embodiment of the method according to the first aspect of the invention, an embodiment of the method according to the first aspect of the invention presented above further comprises providing information at least of the at least two associated objects.

Correspondingly, in a further embodiment of the method according to the second aspect of the invention, an embodiment of the method according to the second aspect of the invention presented above further comprises receiving information at least of the at least two associated objects.

In these two embodiments, the information may for instance comprise respective CPE positions and/or respective CARs respectively related to the at least two associated objects. The information may for instance further comprise respective identifiers of the respective CPEs and/or respective CARs. The information may for instance be provided/received to enable a receiver of the information to perform positioning at least partially based on the received information. The information may for instance comprise information that is indicative of an association of the at least two associated objects, or which allows to derive this association. For instance, the at least two associated objects may be provided/received together with the at least one same region, for instance in a way (for instance in a pre-defined format) that indicates that the at least two associated objects are both linked to the at least one same region.

In certain embodiments of all aspects of the invention, the first CS is a cellular radio system, and the second CS is a non-cellular radio CS. Various examples of such CSs have already been described above.

In certain embodiments of all aspects of the invention, an object of the at least two objects is linked to a region of the grid of regions in at least one of the cases that a CAR to which the object is related at least partially overlays the region and that a CPE to which the object is related is at least partially located in the region.

In certain embodiments of all aspects of the invention, the regions are quadrants of a grid of quadrants obtainable by dividing a longitude axis and a latitude axis of the Earth into a plurality of quadrants of size x times y degrees, wherein x and y are real numbers. The numbers x and y may for instance be the same, yielding square regions/quadrants. The numbers x and y may for instance represented by an integer division factor that may for instance range from 1 to 100, corresponding to resolutions (in case of x=y) of 0.01 by 0.01 degrees to 1 by 1 degrees, respectively. The numbers x and y may for instance be fixed (at least with respect to a database in which all of the objects are stored), but may equally well be dynamically adjusted.

In a further embodiment of the method according to the first aspect of the invention, an embodiment of the method according to the first aspect of the invention presented above further comprises providing, for at least one of the at least two objects that have been respectively linked to the one or more respective regions of the grid of regions, a respective representation of a respective position of the at least one of a respective coverage area representation and a respective coverage-providing entity to which the at least one object is respectively related, and wherein the respective representation of the respective position is respectively based on at least one of the one or more respective regions respectively linked to the at least one object.

Correspondingly, in a further embodiment of the method according to the second aspect of the invention, an embodiment of the method according to the second aspect of the invention presented above further comprises receiving, for at least one of the at least two objects that have been respectively linked to the one or more respective regions of the grid of regions, a respective representation of a respective position of the at least one of a respective coverage area representation and a respective coverage-providing entity to which the at least one object is respectively related, wherein the respective representation of the respective position is respectively based on at least one of the one or more respective regions respectively linked to the at least one object.

These two embodiments (and their further possible variations described below) do not necessarily require that at least two objects of the at least two objects that have been respectively linked to one or more respective regions have been associated with each other. The former embodiment should thus be considered to be also disclosed for instance as further limitation of a method that comprises respectively linking at least two objects of a plurality of objects to one or more respective regions of a grid of regions, wherein the at least two objects are respectively related to at least one of a respective coverage area representation and a respective coverage-providing entity. The later embodiment should thus be considered to be also disclosed for instance as further limitation of a method that comprises receiving information on at least two objects of a plurality of objects, the at least two objects respectively linked to one or more respective regions of a grid of regions, wherein the at least two objects are respectively related to at least one of a respective coverage area representation and a respective coverage-providing entity. Therein, the former embodiment may for instance be performed by an apparatus, such as for instance a server, and the latter embodiment may for instance be performed by an apparatus, such as for instance a terminal. Both embodiments may be implemented in a computer program as described with reference to the first and second aspect of the invention above. For these two embodiments, of course the description of the features (e.g. the description of the CARs/CPEs, objects, CSs, regions, grid of regions, linkage of region(s) to objects, etc.) described for the embodiments presented above equally applies.

Nevertheless, these two embodiments constitute of course also further limitations of the embodiments in which at least two objects are associated with each other based on a finding that the at least two objects are linked to at least one same region. For instance, at least one (or even all) of the provided/received respective representations of the respective positions of the respective CAR and/or of the respective CPE may be for at least one (or even all) of the at least two associated objects.

In these two embodiments, thus for at least one object, a representation of a position of a CAR and/or a CPE to which the at least one object is respectively related is provided/received, and this representation of the position is based on at least one of the one or more regions linked to the at least one object. The position of the CAR may for instance be a position of a parameter of the CAR, such as for instance a center position in case of an elliptical coverage area model.

The representation of the position may for instance be based on (or comprise) an identifier of the at least one of the one or more regions linked to the at least one object. For instance, the representation of the position may be an identifier of one region of the one or more regions linked to the at least one object. This one region may for instance be the region that contains the position.

Representing positions of CARs/CPEs for objects based on respective regions linked to the objects may significantly contribute to reduce an amount of data that has to be transferred between a server and a terminal, as compared to a scenario where the positions themselves have to be transferred. Furthermore, if representations of positions are provided/received for associated objects that are linked to at least one same region, a further reduction of the data to be transferred may be achieved, since an identification of the at least one some region may only have to be transferred once for the (two or more) associated objects, as compared to a scenario where positions of each object have to be transferred.

The respective representation of the respective position may further be respectively based on a respective sub-region obtained by subdivision of at least one of the one or more respective regions respectively linked to the at least one object. The respective subdivision may for instance be adjusted in dependence on a respective desired resolution of the respective representation of the respective position. A respective representation of a respective position of a respective CPE and/or CAR related to a respective object may then for instance not only be expressed with reference to a region in which it lies, but also with reference to a sub-region of the region (in which sub-region the position lies).

This may allow adapting a resolution of the position representation to the object type. For instance, whereas country and operator objects may only require coarse position representations and may thus not require a subdivision of the regions, LAC objects and cell objects and CPE objects may require position representations of higher accuracy and may thus deploy subdivision of regions.

Information representative of the respective subdivision may for instance be provided/received together with the respective representation of the respective position. Such information may for instance be expressed by a divider that indicates into how many slices both dimensions of a region shall be subdivided (for instance, a divider of 2 would result in 4 sub-regions, and a divider of 3 would result in 9 sub-regions per region). Such information may for instance only be transferred once for several objects that are linked to a same region.

Furthermore, run-length coding may for instance be used to indicate the respective sub-region based on which the respective representation of the respective position is further respectively based. The run-length coding may for instance indicate a sub-region not by two coordinates with respect to the sub-region grid within a region. It may rather indicate this sub-region by an integer that indicates, for a defined path through the sub-regions of a region, with respect to a specific sub-region of the region, how many sub-regions have to be passed until arriving at the sub-region to be identified by the run-length coding. Therein, the specific sub-region may for instance be a pre-defined starting sub-region in case that only one position representation per region is to be expressed, or may be a sub-region relating to another position representation that is based on the same region (and another or the same sub-region).

For instance, in case that respective representations of respective positions for at least two of the at least two objects that have been respectively linked to the one or more respective regions of the grid of regions are based on respective sub-regions in a same region of the grid of regions, for at least one of the at least two objects, the run-length coding may refer to a sub-region related to a representation of a position for at least one other object of the at least two objects.

In certain embodiments of all aspects of the invention, at least one of the at least two associated objects is identified as being associated with an area based on a finding that at least one of the one or more respective regions that have been linked to the at least one object is at least partially contained in the area.

This embodiment (and its further possible variations described below) does not necessarily require that at least two objects of the at least two objects that have been respectively linked to one or more respective regions have been associated with each other. This embodiment should thus be considered to be also disclosed for instance as a method that comprises respectively linking one or more objects of a plurality of objects to one or more respective regions of a grid of regions, wherein the one or more objects are respectively related to at least one of a respective coverage area representation and a respective coverage-providing entity, and identifying at least one of the one or more objects as being associated with an area based on a finding that at least one of the one or more respective regions that have been linked to the at least one object is at least partially contained in the area. This embodiment should thus be considered to be also disclosed for instance as a method that comprises receiving information on at least one object of one or more objects that has been identified as being associated with an area based on a finding that at least one of one or more respective regions of a grid of regions that have been linked to the at least one object is at least partially contained in the area, wherein the one or more objects are respectively related to at least one of a respective coverage area representation and a respective coverage-providing entity. Therein, the former embodiment may for instance be performed by an apparatus, such as for instance a server, and the latter embodiment may for instance be performed by an apparatus, such as for instance a terminal. Both embodiments may be implemented in a computer program as described with reference to the first and second aspect of the invention above. For these two embodiments, of course the description of the features (e.g. the description of the CARs/CPEs, objects, CSs, regions, grid of regions, linkage of region(s) to objects, representation of positions of CARs/CPEs based on regions/sub-regions etc.) described for the embodiments presented above equally applies.

Nevertheless, these two embodiments constitute of course also further limitations of the embodiments in which at least two objects are associated with each other based on a finding that the at least two objects are linked to at least one same region. For instance, at least one of the at least two associated objects may have been identified as described by these two embodiments.

Identifying at least one object as being associated with an area based on a finding that at least one of the one or more respective regions that have been linked to the at least one object is at least partially contained in the area may for instance be advantageously deployed when a request (for instance from a terminal) for identification of one or more objects associated with an area specified in the request is received (for instance by a server that comprises or has access to a database that stores the one or more objects). Therein, the area may for instance be defined as a rectangular, circular or elliptical area, to name but a few examples. Instead of checking which of the respective CARs or CPE positions lie within this area, it may be significantly less computationally expensive (for instance since the regions have a simple geometrical shape such as for instance a rectangular or square shape) to only identify the regions that are at least partially located in this area, and then to identify the objects that are associated with these regions. Therein, it may for instance be sufficient to determine the regions that are at the boundary of the area, and to deduce the regions that are within this boundary based on knowledge how identifiers of the regions are assigned to the regions. For instance, if, in a specific row of the grid of regions, the leftmost and rightmost regions contained in the area are known, the regions in between these two regions may be determined based on knowledge that, within a row, at least a part of the identifiers of the regions increases when stepping from left to right. A similar approach may then be pursued with respect to the columns of the grid of regions.

The at least one object may for instance be identified by determining one or more regions of the grid of regions that are at least partially contained in the area; and identifying the at least one object as an object that has been linked to at least one of the one or more determined regions.

Alternatively, the at least one object may for instance be identified by determining a list of respective identifiers of one or more regions of the grid of regions that are at least partially contained in the area; and identifying the at least one object as an object that has been linked to a region with an identifier comprised in the list of identifiers.

In certain embodiments of all aspects of the invention, each object of the plurality of objects is stored in a database and has a respective version number that is unique within the database and is obtained by increasing a respective up-to-then highest version number in the database when the object is one of updated and newly added and by assigning the increased version number to the object.

In certain embodiments of all aspects of the invention, each object of the plurality of objects is stored in a database and has a respective version number that is unique within the database and is obtained by decreasing a respective up-to-then lowest version number in the database when the object is one of updated and newly added and by assigning the decreased version number to the object.

In the following, these two embodiments will be jointly referred to using forward-slash notation with respect to the terms "highest/lowest" and "increasing/decreasing", wherein the terms at the left of the forward-slash relate to the first embodiment, and the terms at the right of the forward-slash relate to the second embodiment.

These two embodiments (and their further possible variations described below) do not necessarily require that at least two objects have been respectively linked to one or more regions, and/or that at least two objects of the at least two objects that have been respectively linked to one or more respective regions have been associated with each other.

Thus also the following embodiments should be considered to be disclosed: a method (for instance performed by an apparatus such as for instance a server, which may for instance comprise the database) that comprises storing each object of a plurality of objects in a database, wherein the objects are respectively related to at least one of a respective CAR and a respective CPE, and wherein each of the objects has a respective version number that is unique within the database and is obtained by increasing/decreasing a respective up-to-then highest/lowest version number in the database when the object is one of updated and newly added and by assigning the increased/decreased version number to the object; and a method (for instance performed by an apparatus such as for instance a terminal) that comprises receiving (for instance from a server comprising a database) information on at least one object of a plurality of objects stored in a database, wherein the objects are respectively related to at least one of a respective CAR and a respective CPE, and wherein each of the objects has a respective version number that is unique within the database and is obtained by increasing/decreasing a respective up-to-then highest/lowest version number in the database when the object is one of updated and newly added and by assigning the increased/decreased version number to the object. Both embodiments may be implemented in a computer program as described with reference to the first and second aspect of the invention above. For these two embodiments, of course the description of the features (e.g. the description of the CARs/CPEs, objects, CSs, regions, grid of regions, linkage of region(s) to objects, representation of positions of CARs/CPEs based on regions/sub-regions, identification of objects as being associated with an area based on the regions, etc.) described for the embodiments presented above equally applies.

Nevertheless, these two embodiments constitute of course also further limitations of the embodiments of the invention in which at least two objects are associated with each other based on a finding that the at least two objects are linked to at least one same region.

Therein, an update of an object may for instance comprise an update of a CAR and an update of a position of a CPE, to name but a few examples.

Having a unique version number for each object in the database and obtaining new version numbers by increasing/decreasing the up-to-then highest/lowest version number in the database may allow a tracking of updates/changes in the database with particularly low complexity.

For instance, the respective unique version numbers of the plurality of objects stored in the database may be used to identify objects in the database that have been at least one of updated and newly added.

Furthermore, at least one object of the plurality of objects may be requestable (for instance from an apparatus according to the second aspect of the invention, e.g. a terminal) from the database (which may be comprised in the apparatus according to the first aspect of the invention, e.g. a server) together with information on a version number in order to receive only objects from the database that have a higher/lower version number.

The information on the version number may for instance be information on a version number that is, among one or more objects received from the database so far, a highest version number. Then, the objects from the database that have a higher version number may for instance be objects that have been at least one of updated and newly added since a reception of the one or more objects received from the database so far.

For instance, if a terminal (e.g. an apparatus according to the second aspect of the invention) has received information on a plurality of objects from a server that comprises and/or has access to the database (e.g. an apparatus according to the first aspect of the invention), and if a highest/lowest version number among the objects of this plurality of objects is known to the terminal, in a subsequent update request, the terminal may indicate this highest/lowest version number to the server, so that the server then will only provide information on objects with higher/lower version numbers that have been updated/added in the meantime. Alternatively, a record of the highest (or lowest) version number of objects provided to a terminal last time may be kept by the server.

Alternatively, the information on the version number may for instance be information on a version number that is set to a value that equals a version number assigned to an object added first to the database minus one. For instance, if the first object added to the database is assigned version number 1 (since the up-to-then highest version number in the database defaults to 0), the information on the version number may be set to 0. This indicates that basically all objects in the database are requested (since they all have a version number higher than 0), unless they are not excluded by filter criteria that may optionally be included in the request. For instance, a terminal may thus flush its local database by requesting one or more objects from the database together information on version number 0.

Equally well, when a request is accompanied by the lowest/highest possible version number, information on all objects stored in the database may be obtained.

Furthermore, an update and/or addition of an object may also be considered as an update of a hierarchically higher object, so that a new version number is also assigned to the hierarchically higher object. Therein, the new version number may also be determined by increasing (or decreasing) the up-to-then highest/lowest version number in the database (including the version number assigned to the object, if the object is assigned a version number before the hierarchically higher object).

The description of any embodiments of a method according to the invention (e.g. a method according to the first or second aspect of the invention) is also understood to disclose that the computer program code and the processor, or some other means, of a corresponding (embodiment of an) apparatus (e.g. an apparatus according to the first or second aspect of the invention) are configured to realize a corresponding function, that a corresponding (embodiment of a) computer program (e.g. a computer program according to the first or second aspect of the invention) comprises computer program code defined to cause a corresponding action when executed and that also a (corresponding embodiment of a) system (e.g. a system according to the third aspect of the invention) or components thereof are configured to realize a corresponding function.

The embodiments of the methods, apparatuses, computer programs and the system according to the invention presented above and their single features are understood to be disclosed also in all possible combinations with each other.

Further, it is to be understood that the presentation of the invention in this section is based on non-limiting example embodiments.

Other features of the invention will be apparent from and elucidated with reference to the detailed description presented hereinafter in conjunction with the accompanying drawings. It is to be understood, however, that the drawings are designed solely for purposes of illustration and not as a definition of the limits of the invention, for which reference should be made to the appended claims. It should further be understood that the drawings are not drawn to scale and that they are merely intended to conceptually illustrate the structures and procedures described therein. In particular, presence of features in the drawings should not be considered to render these features mandatory for the invention.

DETAILED DESCRIPTION OF EMBODIMENTS OF THE INVENTION

Figure 1:
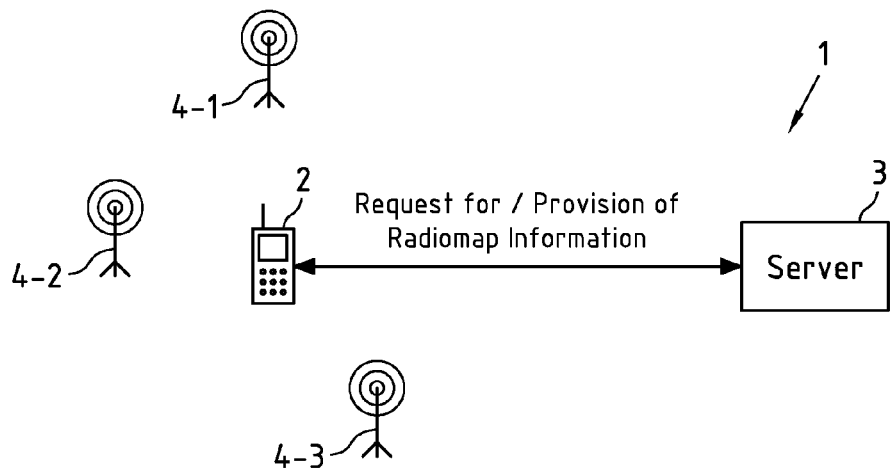
FIG. 1: An embodiment of a system according to the invention.

WLAN Access Points (WLAN APs) can be used for positioning given that the position(s) of the AP(s) are known. For instance, WLAN-based positioning may assume a database, either local (in the terminal) or remote (in the server) comprising for instance WLAN AP identification information (e.g. a WLAN AP MAC address) and the geographical coordinates of the WLAN APs. The database may also contain an estimate of the WLAN AP position accuracy.

Such a database can be built in various ways. One solution is that a company buys hotspot directories from WLAN network providers and assimilates these directories in their databases. Alternatively, the terminals using the WLAN-based positioning service may perform the WLAN AP mapping. In such a case, the terminals may for instance use an (Assisted) Global Navigation Satellite System (A)GNSS receiver attached to or inside the terminal. It may also be the case that the database build-up is a community-based effort.

Alternatively, the database may also contain so-called "fingerprint" records that include position information as well as WLAN AP signal strength information. Position determination may then for instance be based on comparing, for instance statistically or deterministically, the fingerprints in the database to the fingerprint measured by the terminal.

The database of WLAN APs and their geographical coordinates allows for positioning the terminal with WLAN. GNSS or some other conventional positioning capability may then not be required. In positioning, the terminal performs a WLAN AP scan and then compares the scan results to the records in the database. If applicable records are found, the information is combined in some suitable manner (such as for instance determining a weighted average based on Relative Signal Strength (RSS) values) to produce a position estimate for the terminal.

WLAN-based positioning may complement GNSS-based positioning for instance in urban environments. Typically GNSS-based positioning methods have problems in urban canyons—however, these are also areas, in which the WLAN AP density is high. WLAN-positioning may also enable indoor positioning allowing for more effective Location Based Services (LBS).

WLAN-based positioning may also be combined/complemented with Cell ID-based positioning (e.g. positioning that is based on information on CARs (e.g. coverage area models) for cellular CSs such as cellular radio CSs of the second (2G), third (3G) and/or fourth (4G) generation). When collecting the data for the WLAN AP database, it may also be natural to also collect information on cells of cellular CSs that can be observed in the position (for instance serving cells and/or neighbouring cells).

The data collected on WLAN APs and 2G/3G/4G cells can be collected on servers and distributed to the terminals for position determination. Such a database in the server is sometimes referred to as "a radiomap database" (or also as "radiomap" only) or as a "fingerprint database".

Positioning may then be performed in at least two ways. A first way is a terminal-assisted mode, in which the terminal reports measurements to the server, which performs the positioning and returns the position estimate. A second way is a terminal-based mode, in which the terminal has, say, the WLAN AP information (e.g. positions and identifiers) in a local cache, and no network interaction may be needed in the positioning process.

Embodiments of this invention deal with how to handle the hierarchical 2G/3G/4G cell infrastructure and the hierarchy-less WLAN AP infrastructure that is separate or independent of the 2G/3G/4G cell infrastructure in the same radiomap (database). Moreover, embodiments of the invention also describe, how the same mechanism can be used effectively in when carrying information on at least parts of the radiomap to the terminals (e.g. based on a protocol).

In embodiments of the invention, the radiomaps may store CARs (e.g. coverage area models) and positions of CPEs (e.g. WLAN APs or cellular base stations). Therein, the CARs may for instance be embodied as models representing hard boundaries (i.e. a true maximal coverage area) or a statistical representation of the coverage area (such as a multi-normal distribution). A CAR may for instance relate to a single CPE, or to a plurality of CPEs.

The CARs and CPEs stored in the radiomaps may for instance be related to different objects including for instance:

Countries
Operators
Local Area Codes (LACs, e.g. for GERAN, the Radio Access Network of the Global System for Mobile Communications (GSM) and/or the Enhanced Data Rates for Global Evolution (EDGE))
Radio Network Controller (RNC, e.g. for UTRAN)
Cell-ID (CID, e.g. for GERAN)
UC-ID (UTRAN Cell-ID)
LTE Cell ID
WLAN Therein, it should be noted that at least some of these objects may only be unique if they are considered together with one or more hierarchically higher objects. For instance, an operator object may be unique when considered together with an hierarchically higher country object, an LAC object or an RNC object may be unique when considered together with an hierarchically higher operator object and a country object that is hierarchically higher than the operator object, a GERAN cell object may be unique when considered together with a chain of hierarchically higher LAC, operator and country objects, and a UMTS or LTE cell object may be unique when considered together with a chain of hierarchically higher operator and country objects.

The hierarchy of objects may for instance be as follows for the 2G/3G/4G CSs, respectively:
2G Cell Info:
    Mobile Country code (MCC)-Mobile Network Code (MNC)-Local Area Code (LAC)-Cell Identity (CID)
3G Cell Info:
    Mobile Country code (MCC)-Mobile Network Code (MNC)-UTRAN Cell ID (UC-ID);
    Note: The UC-ID may in some implementations have a fine structure with RNC-ID (Radio Network Controller) and Cell ID within the UC-ID.
4G Cell Info:
    Mobile Country code (MCC)-Mobile Network Code (MNC)-LTE Cell Identity In non-hierarchical CSs such as WLAN, objects are for instance WLAN objects, which may comprise for instance respective MAC addresses.

In example embodiments of the invention, frequently simplified cases with only GSM (2G) cells and WLAN APs in the radiomap are considered. It is however emphasized that the radiomaps may cover all types of CSs, such as for instance cellular systems (e.g. 2G, 3G, 4G systems) and non-cellular systems (such as WLAN, Bluetooth®, NFC, DVB, DAB, AM/FM radio etc.).

FIG. 1 depicts an embodiment of a system 1 according to the invention. The system comprises a terminal 2 and a server 3, which comprises or has access (for instance via a network, which is not shown in FIG. 1) to a radiomap. Terminal 2 may for instance be a terminal that is capable of operating in one or more CSs, which may for instance be of cellular or non-cellular type, and to determine its position in a terminal-based manner based at least on partial information on the radiomap requested from any provided by server 3 and on information on CPEs (such as CPEs 4-1, 4-2 and 4-3) that can currently be heard by terminal 2. Information exchange between terminal 2 and server 3 is based on a CS (either of wired or wireless type), which may for instance be one of the one or more CSs of which terminal 2 hears the CPEs 4-1, 4-2 and 4-3 for positioning purposes, but may equally well be a different CS.

Figure 2:
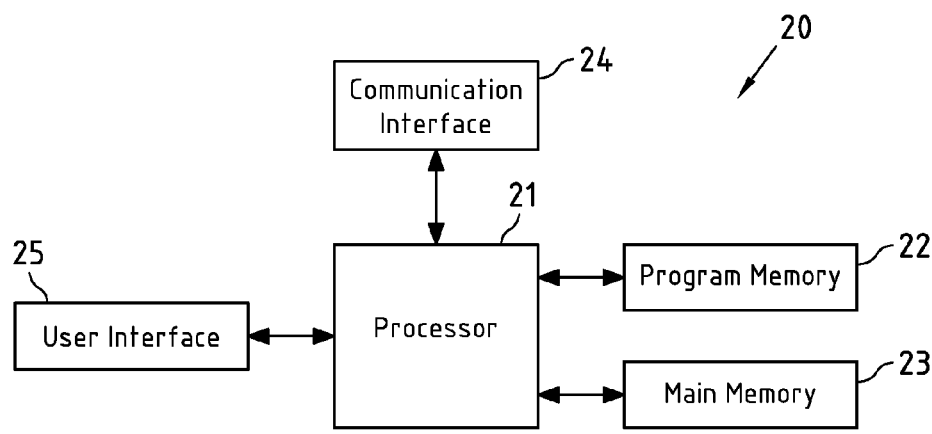
FIG. 2: a schematic block diagram of an embodiment of an apparatus according to the invention, which is or forms a part of a terminal.

FIG. 2 is a schematic block diagram of an embodiment of an apparatus 20 according to the invention. Apparatus is or forms a part of terminal 2 of system 1 (see FIG. 1).

Apparatus 20 comprises a processor 21, which may for instance be embodied as a microprocessor, Digital Signal Processor (DSP) or Application Specific Integrated Circuit (ASIC), to name but a few non-limiting examples. Processor 21 executes a program code stored in program memory 22 (for instance program code implementing one or more of the embodiments of a method according to the present invention described below with reference to FIGS. 6, 10, 13 and 16), and interfaces with a main memory 23, which may for instance store a local copy of a radiomap (or at least a part thereof). Some or all of memories 22 and 23 may also be included into processor 21. Memories 22 and/or 23 may for instance be embodied as Read-Only Memory (ROM), Random Access Memory (RAM), to name but a few non-limiting examples. One of or both of memories 22 and 23 may be fixedly connected to processor 21 or removable from processor 21, for instance in the form of a memory card or stick.

Processor 21 further controls a communication interface 24 configured to receive and/or output information. For instance, communication interface 24 may be configured to exchange information with server 3 of system 1 (see FIG. 1). This may for instance comprise sending requests to server 3 and receiving information on objects (such as representations of positions of CPEs/CARs) stored in a radiomap from server 3. This communication may for instance be based on a wire-bound or wireless connection. Communication interface 24 may thus for instance comprise circuitry such as modulators, filters, mixers, switches and/or one or more antennas to allow transmission and/or reception of signals. In embodiments of the invention, communication interface 24 is configured to allow communication according to a 2G/3G/4G cellular CS and/or a WLAN.

Processor 21 further controls a user interface 25 configured to present information to a user of apparatus 20 and/or to receive information from such a user. Such information may for instance comprise information on a position determined by positioning based on heard CPEs and according radiomap information. User interface 25 may for instance be the standard user interface via which a user of entities 1 or 2 interacts with terminal 2 to control other functionality of terminal 2, such as making phone calls, browsing the Internet, etc.

Figure 3:
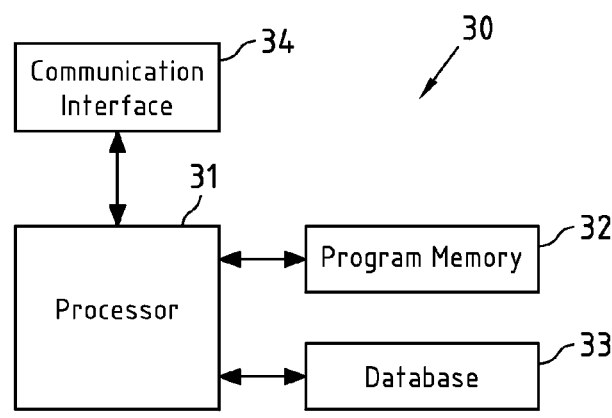
FIG. 3: a schematic block diagram of an embodiment of an apparatus according to the invention, which is or forms a part of a server.

FIG. 3 is a schematic block diagram of an embodiment of an apparatus 30 according to the invention. Apparatus 30 is or forms a part of server 3 of system 1 (see FIG. 1).

Apparatus 30 comprises a processor 31, which may for instance be embodied as a microprocessor, Digital Signal Processor (DSP) or Application Specific Integrated Circuit (ASIC), to name but a few non-limiting examples. Processor 31 executes a program code stored in program memory 32 (for instance program code implementing one or more of the embodiments of a method according to the present invention described below with reference to FIGS. 5, 9, 12 and 15).

Processor 31 further interfaces with a database 33, which may for instance store a radiomap with information on objects of one or more CSs (e.g. information on CPEs and/or CARs of cell or WLAN objects). Memory 32 may also be included into processor 31. Memory 32 may for instance be embodied as Read-Only Memory (ROM) or Random Access Memory (RAM), to name but a few non-limiting examples. Memory 32 may be fixedly connected to processor 31 or removable from processor 31, for instance in the form of a memory card or stick. Database 33 may for instance be embodied as mass storage device, for instance with capacities of several Gigabyte or several Terabyte. It may either be fixedly connected to processor 31, or may be releasably connectable thereto.

Processor 31 further controls a communication interface 34 configured to receive and/or output information. For instance, communication interface 34 may be configured to exchange information with terminal 2 of system 1 (see FIG. 1). This may for instance comprise receiving requests from terminal 2 and providing information on objects (such as information on CPEs/CARs) stored in database 33 to terminal 2. This communication may for instance be based on a wire-bound or wireless connection. Communication interface 34 may thus for instance comprise circuitry such as modulators, filters, mixers, switches and/or one or more antennas to allow transmission and/or reception of signals. In embodiments of the invention, communication interface 34 is configured to allow communication according to a 2G/3G/4G cellular CS and/or a WLAN.

It is to be noted that the circuitry formed by the components of apparatuses 20 and 30 may be implemented in hardware alone, partially in hardware and in software, or in software only, as further described at the end of this specification.

Figure 4:
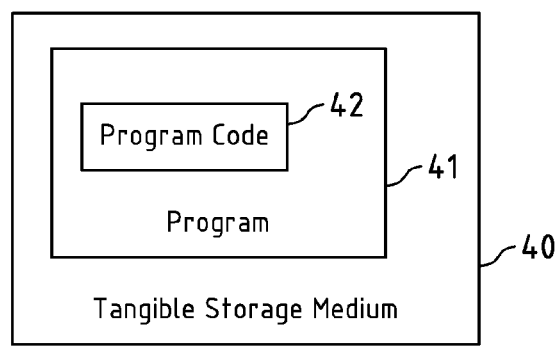
FIG. 4: a schematic presentation of an embodiment of a tangible storage medium according to the invention.

FIG. 4 is a schematic presentation of an embodiment of a tangible storage medium 40 according to the invention. This tangible storage medium 40, which may in particular be a non-transitory storage medium, comprises a program 41, which in turn comprises program code 42 (for instance a set of instructions). Realizations of tangible storage medium 40 may for instance be program memories 22 and 32 of FIGS. 2 and 3. Consequently, program code 42 may for instance implement the flowcharts of FIGS. 5, 6, 9, 10, 12, 13, 15 and 16 discussed below.

Assume now that, according to an example embodiment, terminal 2 of system 1 (see FIG. 1) is at least capable of communicating in GSM and WLAN systems.

To be able to additionally position itself based on CPEs (e.g. CPEs 4-1, 4-2 and 4-3 of FIG. 1, which are then GSM base stations and WLAN APs) of these systems currently heard by terminal 2, terminal 2 may request from server 3 information on the CARS/CPEs of the GSM and WLAN system.

To this end, terminal 2 may for instance refer to its LAC and accordingly request information on the according LAC object from the radiomap. If the radiomap retains the inherent hierarchy of the cellular systems (and thus of the GSM system, to which the LAC object pertains), the individual cell coverage models (CARs) belonging to the LAC object can be accessed.

However, since terminal 2 also requires the positions or coverage area models of the WLAN APs (CPEs) in its area, a linkage from the cell coverage area models of the LAC object to the positions/coverage area models of the WLAN objects is needed in the database so that the correct WLAN AP information can also be provided to the terminal.

Coordinate-based evaluations are time consuming, because in the example above server 3 would first need to evaluate for each WLAN object, whether its position or coverage area has an intersection with the defined area of the LAC object. This may be very time consuming.

Similarly, in case that terminal 2 has a dual Subscriber Identity Module (SIM) and requests radiomap information for both CSs (covered by the dual SIM and operated by different operators) based on, say, the LAC of one operator, the cells of the other operator would need to be searched in the database (as the WLAN APs in the example above) through exhaustive search based on the coverage area intersections. Again, this may be unbearable.

Figure 7:
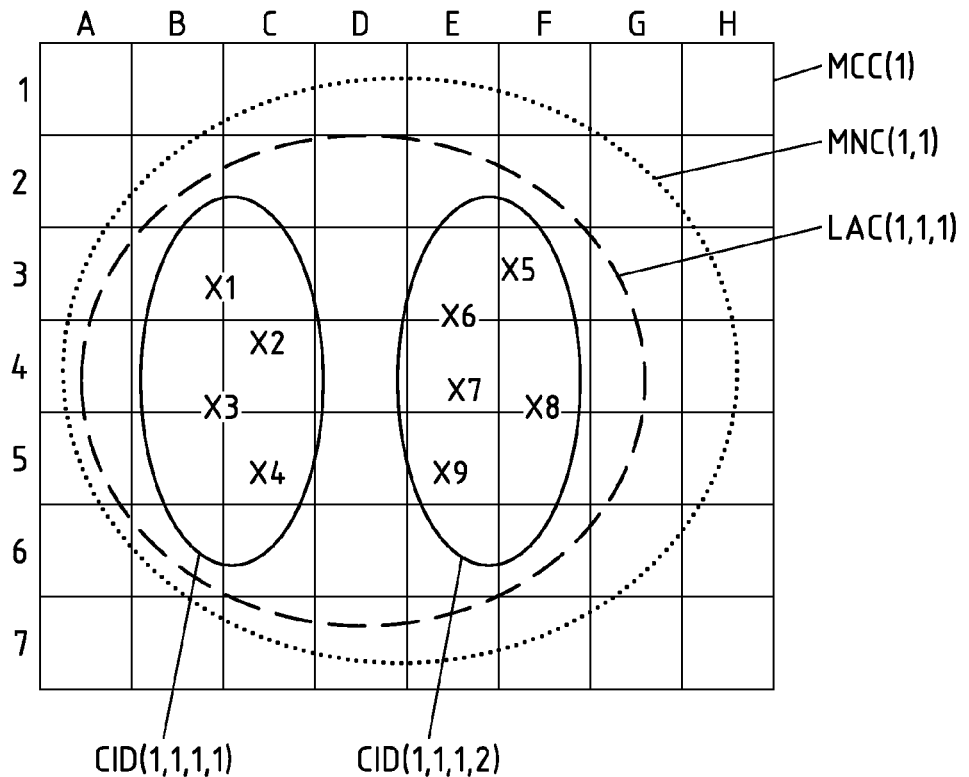
FIG. 7: schematic illustrations of a grid of regions according to an embodiment of the present invention with objects related to coverage areas/coverage-providing entities located therein.
Figure 7:
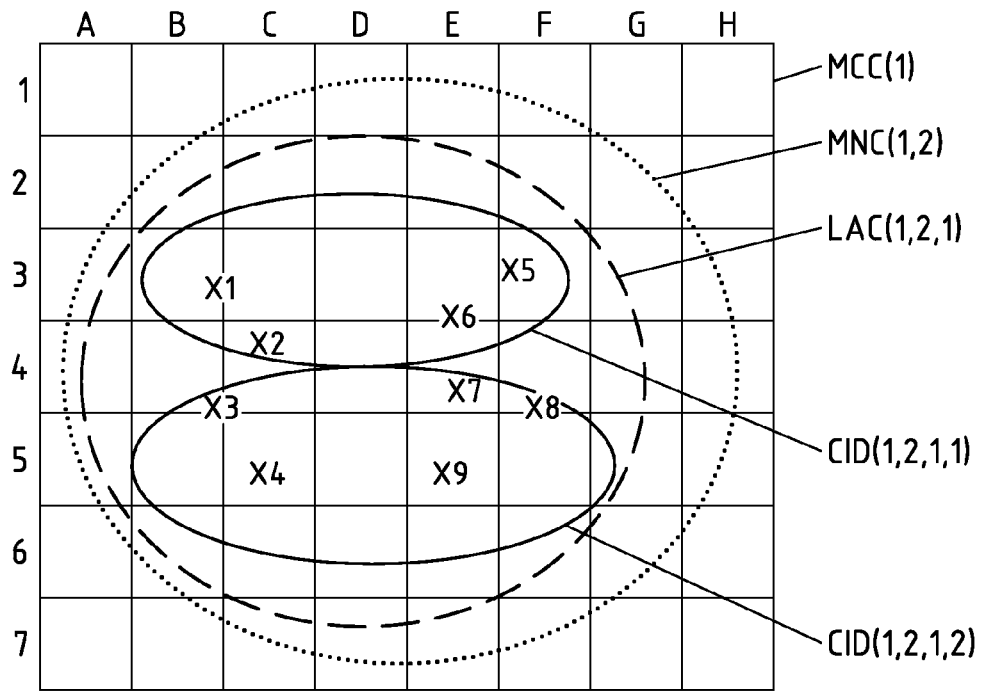

As an example, consider FIG. 7, where the upper and lower parts show two different operators ("1" and "2") operating in the same area in the same country ("1"). The cell notation follows the GSM hierarchy in the format (country (MCC), operator (MNC), location area (LAC), cell (CID)). Therefore, the cell objects for the different operators are (1,1,1,x) and (1,2,1,y), respectively. The WLAN objects are on the other hand marked as crosses which are sequentially numbered, e.g. "X1".

Now, to associate the cell objects of the two operators and the WLAN objects, an approach would be to link the according objects to each other through pointers, when a coverage area model of an object is created or updated. However, this may consume a significant amount of processing power. Moreover, the two-way associations may be needed. Hence, in the case of two operators both operating two network types (e.g. GMS and Wide-band Code Division Multiple Access (WCDMA)) a single WLAN object might have four pointers to it and the WLAN object have four pointers from it. Two WLAN objects therefore result in altogether 16 pointers, etc. It can easily be seen that the amount of processing and storage required for this approach may render it unfeasible. It should also be noted that these links need to be re-evaluated, whenever some coverage area model in the database changes.

Moreover, even if it might be feasible to store these associations to the database in server 3, it may still be required to carry the associations to the terminal(s) utilizing the database. The amount of data in the associations may make this approach unfeasible.

According to embodiments of the invention, therefore an adaptation layer in the radiomap is proposed. The adaptation layer is based on a static or dynamic grid of regions, wherein each object is associated with one or more regions. This allows associating overlapping CARs and/or CPE positions to each other easily via the adaptation layer for database searches.

In embodiments of the present invention, the grid of regions further introduces bit savings in the radiomap transfer, because a region can be identified easily by small integer (s). Bit savings in the radiomap transfer can be introduced via providing a reference point for the objects in the region—then only a location relative to the reference point may have to be expressed.

In embodiments of the present invention, the grid of regions (or a subdivision of one or more of its regions into sub-regions) also forms a basis for dynamic control of position resolution with the region. This can be achieved via Run-Length Encoding (RLE).

Figure 5:
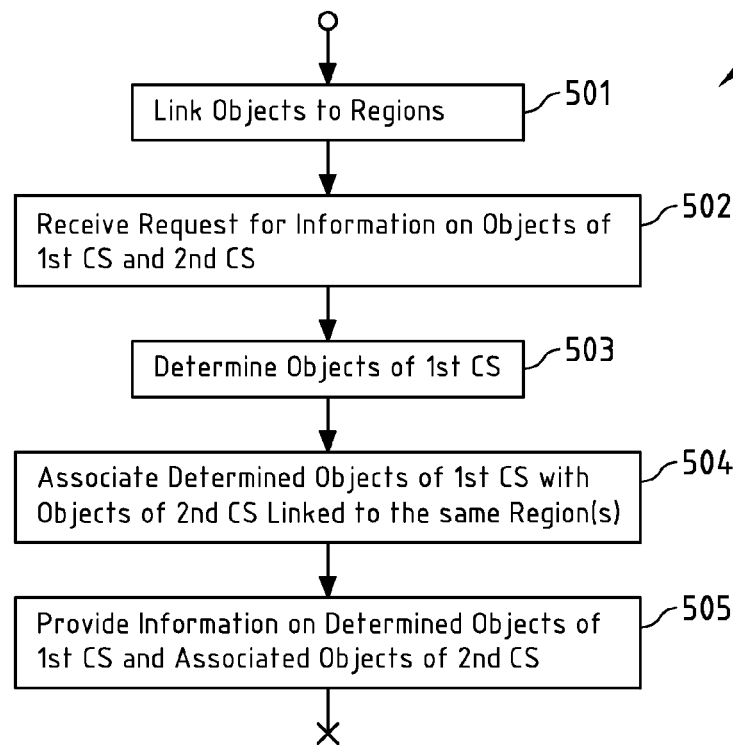
FIG. 5: a flowchart of a first embodiment of a method according to the invention performed by a server.
Figure 6:
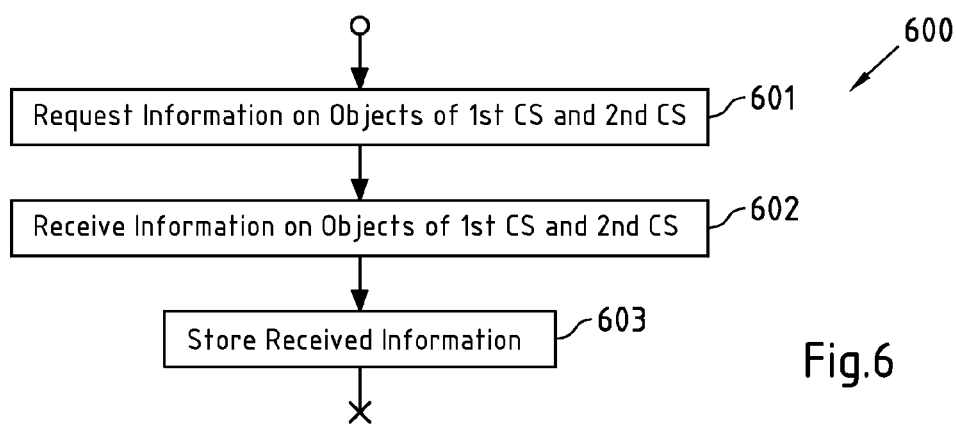
FIG. 6: a flowchart of a second embodiment of a method according to the invention performed by a terminal.

FIG. 5 is a flowchart 500 of a first embodiment of a method according to the invention. This method may for instance be performed server 3 of system. 1 (see FIG. 1). Accordingly, FIG. 6 is a flowchart 600 of a second embodiment of a method according to the invention. This method may for instance be performed terminal 2 of system 1 and complements the method of flowchart 500 of FIG. 5.

In a step 501 of flowchart 500, objects are respectively linked to one or more respective regions of a grid of regions. This grid of regions may be a static or dynamic grid. For all objects for which information is stored in a radiomap, the size of the regions of the grid may be the same. Alternatively, the size may be variable. In the latter case, in the transfer of information on objects of the radiomap, then for instance an indication of the respectively used region size may be contained. Otherwise, if the region size is the same for all objects, it may only have to be indicated to a terminal requesting information on objects once, or may be predefined in the terminal, so that no transfer of this information may be required.

In step 501, the linkage of regions to objects may for instance be achieved by storing an identifier of the one or more regions linked to an object together with other information on the object (for instance together with information on CPEs/CARs related to the object). Equally well, such identifiers may be stored separately, for instance in a look-up-table.

In step 502, a request for information on objects of a first CS and a second CS is received from terminal 2 (see FIG. 2). This request is launched by terminal 2 in step 601 of the flowchart 600 of FIG. 6. As described as an example already above, this request may for instance be directed to cell objects of a first (GSM) CS and WLAN objects of a second CS, both with respect to a given area, which is however specified with respect to an LAC (i.e. in terms of the hierarchy of the GSM CS, which hierarchy is however not linked to the WLAN system that lacks hierarchy).

In step 503, server 3 determines the (cell) objects of the first CS, setting out from the LAC object contained in the request and relying on the hierarchy of the GSM objects preserved in the radiomap.

In step 504, the determined (cell) objects are then associated with objects of the second (WLAN) CS that have been respectively linked to at least one same region in step 501.

As an alternative to step 504, server 3 could associate the LAC object itself with objects of the second (WLAN) CS that have been linked in step 501 to respective regions that are the same as the one or more regions to which the LAC object has been linked in step 501.

As a result, in step 505, information on the determined objects of the first CS of step 503 and the associated objects of the second CS of step 504 are then provided by server 3 to terminal 2. Accordingly, in step 602 of flowchart 600 of FIG. 6, terminal 2 receives this information. In a step 603 of flowchart 600, terminal 2 then stores the information received in step 602, for instance for later reference in positioning based on heard CPEs (GSM base stations and WLAN APs in this example).

It should be noted that, in steps 601/502 of flowcharts 600/500 of FIGS. 6/5, instead of having a request for cell objects of the first CS and WLAN objects of the second CS, also a request for a LAC (or any other hierarchical object) object of the first CS and WLAN objects of the second CS (or other objects of the second CS) could be used. Server 3, in step 504, may then for instance associate the LAC object itself with objects of the second (WLAN) CS that have been linked in step 501 to respective regions that are the same as the one or more regions to which the LAC object has been linked in step 501, and may provide information on the LAC object and on the associated (WLAN) objects of the second CS to terminal 2, steps 505 and 602. Equally well, for instance LAC objects for a whole country may be requested as objects of a first CS and then provided with accordingly associated objects of a second CS.

Returning now to the example of FIG. 7, the grid of regions displayed in both the upper and the lower part should be paid attention to. In both parts, the area in which the different objects are located has been divided into regions by a static grid (with 8 columns numbered "A" to "H" and 7 rows numbered "1" to "7").

According to step 501 of flowchart 500 of FIG. 5, each object (e.g. cell objects CID(1,1,1,1) and CID(1,2,1,1)) (is linked to those one or more regions of this grid of regions that the CAR (coverage area model) related to this object overlays (so that the CAR is completely covered by these one or more regions).

Figure 8:
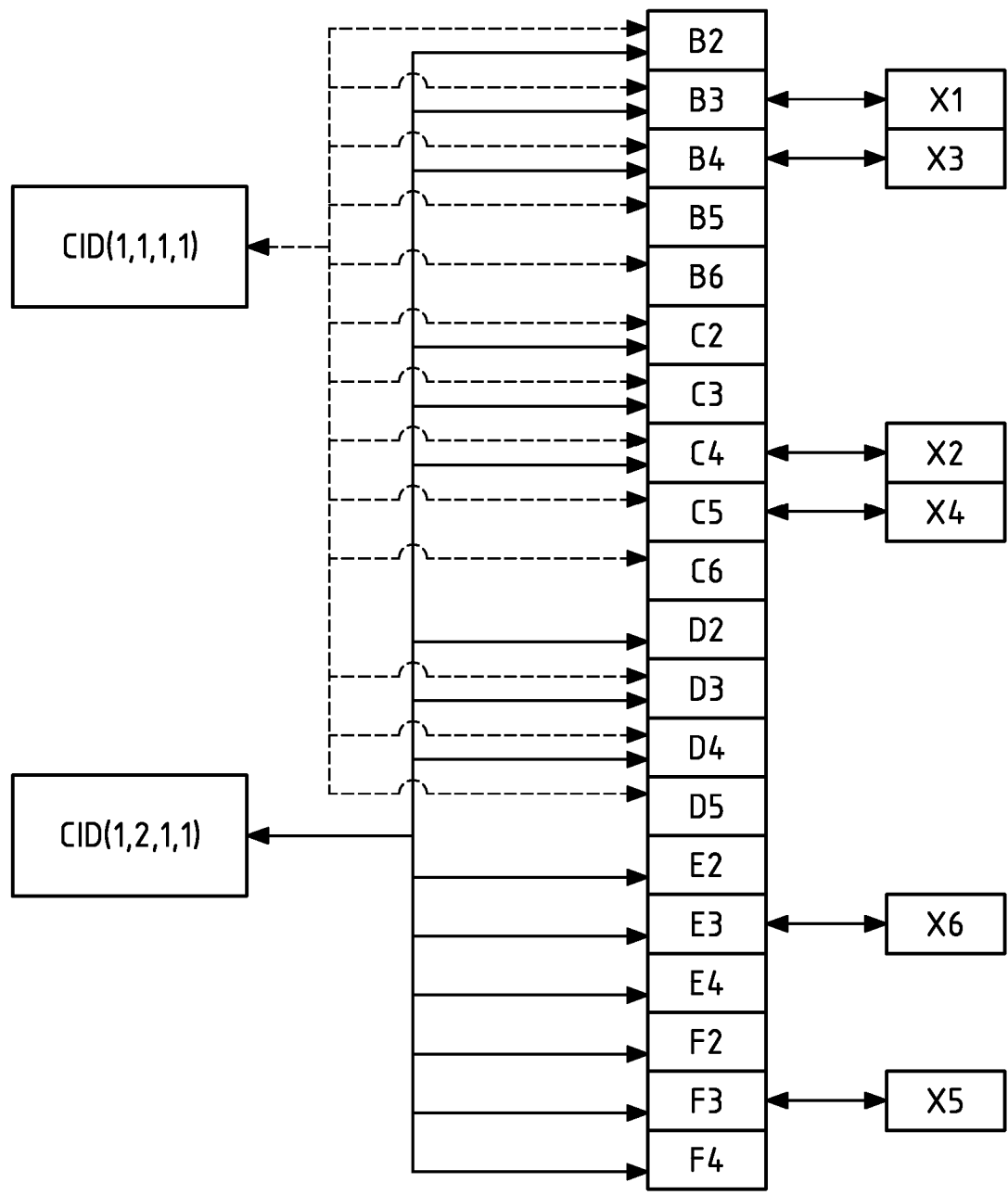
FIG. 8: a schematic illustration of associations between objects of FIG. 7 formed based on common regions according to an embodiment of the invention.

FIG. 8 shows to which regions (identified by a two-digit combination of their respective column and row identifiers) the cell objects CID(1,1,1,1) and CID(1,2,1,1) of FIG. 7 have been linked. For instance, CID(1,1,1,1) is linked to regions B2, B3, B4, B5, B6, C2, C3, C4, C5, C6, D3, D4 and D5, as shown in dashed lines. CID(1,2,1,1) is linked to regions B2, B3, B4, C2, C3, C4, D2, D3, D4, E2, E3, E4, F2, F3 and F4, as shown in solid lines. As can be seen from FIG. 8, these links are two-way.

When each cell object is two-way linked to a region, it's possible to pick other cell objects related to CARs/CPE positions overlapping the CAR/CPE position related to this cell object. Moreover, if it is wished to obtain all the cell objects (for instance irrespective of the operator) that appear in the area of, say, a LAC for a given operator, it's possible to pick the regions belonging to the corresponding LAC object and then pick all the cell objects associated with those regions.

Moreover, should there be a change in the CAR or in the CPE position related to a cell object, then only the regions associated with that cell object may have to be updated. In an alternative implementation with cell objects associated with each other directly, there would be a significant amount of associations to update in case of such a change. Those associations may have to be searched via an exhaustive search in the database. In contrast, the proposed scheme of using the grid of regions as an adaptation layer is simple, because it is possible to link objects to one or more respective regions.

As shown in FIG. 8, the WLAN objects of FIG. 7 are also associated with the regions, based on the position of the WLAN APs (CPEs) related to the WLAN objects. Therefore, it's possible to associate WLAN objects with a given cell object, LAC objects, etc.

Here it's exemplarily assumed that the WLAN objects are associated with a single region (i.e. the region contains the CAR or CPE position of the WLAN AP), but this is a non-limiting example.

Similarly, if a location of a given WLAN AP is changed, the only thing that may have to be changed is the region to which the corresponding WLAN object is linked. In the alternative scheme of having direct links to cell objects, the old links would have to be removed and new ones to a set of cell objects would have to be created. Again, thus the adaptation layer approach is powerful.

The region-based adaptation thus allows linking different objects with ease to each other for easy lookups. Furthermore, when the CAR/CPE of an object is updated (or a new one created) only the region links need to be updated instead of exhaustively linking the object to all the relevant other objects.

Note that the adaptation layer approach becomes the more efficient the more (overlapping) objects there are in a database.

The regions of the grid of regions shown in FIG. 7 may for instance represent quadrants of a two-dimensional grid dividing the Earth's surface. The grid may for instance be conceived by dividing the longitude and latitude axis into quadrants with a granularity of 0.1 by 0.1 degrees (of course, also higher or lower granularities could be used), resulting to a grid of 3600×1800 (i.e. ~6.5e6) quadrants with the longitude span of 360 degrees and latitude span of 180 degrees. At the equator, this would correspond to a region size of 11 km times 11 km. In minimum a region may then be identified by using 12+11=23 bits.

A position may then for instance be linked to a region as follows: Assume a location with coordinates (x,y) in degrees and a grid granularity of 1/10 degrees. Then, x=floor((x+180)*10) and y=floor((x+90)*10), where the floor function requires rounding to the next smaller integer.

A CAR (here exemplarily an elliptical coverage area model is assumed) may then for instance be linked to a region as follows: Sample points on the ellipse boundary at sufficiently small spacing and assign the regions to the sample points (as described in the previous paragraph). Select additional regions as necessary to make the area represented by the regions unbroken (i.e. no gaps).

Embodiments of the invention also exploit linkage of objects to regions to efficiently represent positions of CPEs and/or positions of CARs.

Figure 9:
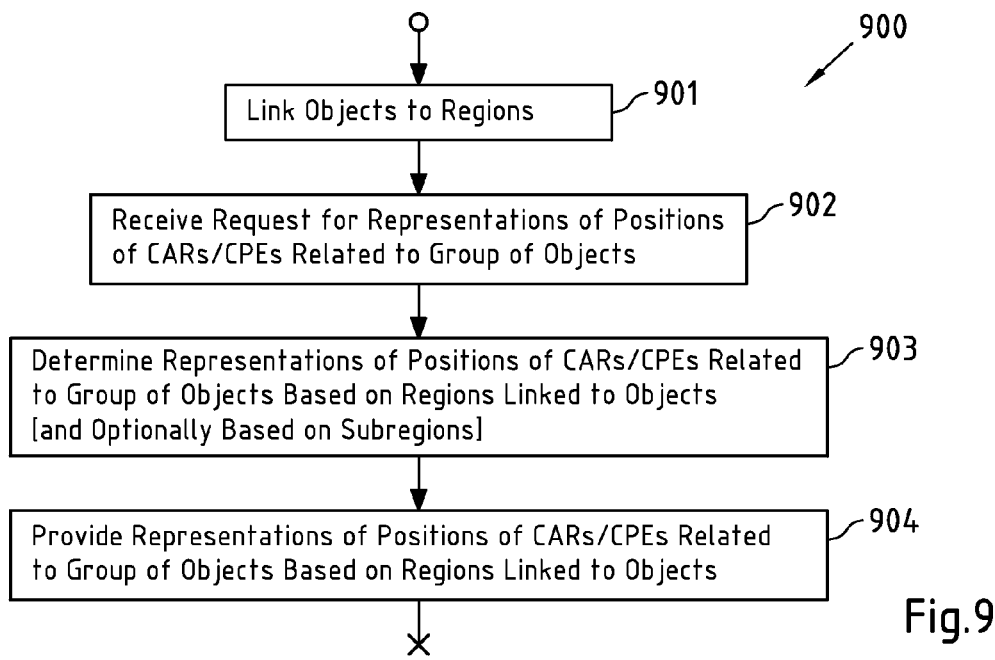
FIG. 9: a flowchart of a third embodiment of a method according to the invention performed by a server.
Figure 10:
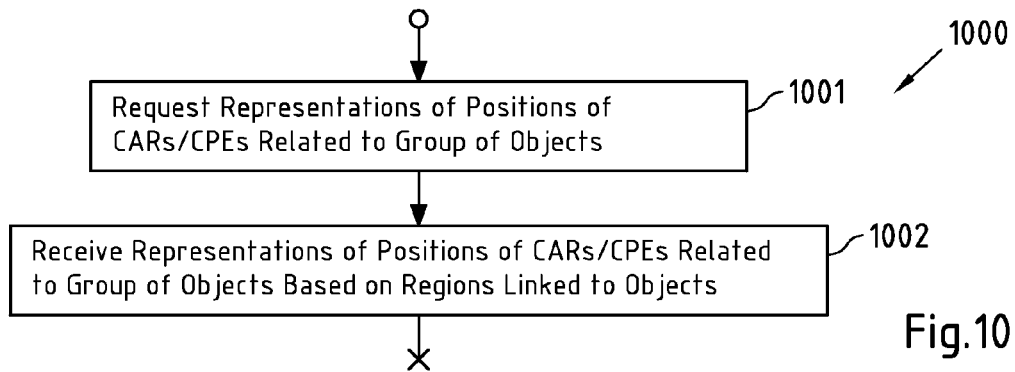
FIG. 10: a flowchart of a fourth embodiment of a method according to the invention performed by a terminal.

Accordingly, FIGS. 9 and 10 are complementary flowcharts 900 and 1000 of third and fourths embodiments of a method according to the invention performed by server 3 of system 1 (see FIG. 1) and terminal 2, respectively.

In step 901 of flowchart 900 of FIG. 9, objects are linked to regions of a grid of region, for instance in the same way as in step 501 of flowchart 500 of FIG. 5.

In a step 902, at server 3, a request for respective representations of respective positions of CARs/CPEs related to a group of objects (for instance all cell objects of a LAC of a GSM CS) is received, which request is launched by terminal 2 in step 1001 of flowchart 1000 of FIG. 10.

In response to this request, in step 903, respective representations of respective positions of CARs/CPEs related to this group of objects are determined based on the regions linked to the objects in step 901 (and optionally further based on sub-regions, as will be explained further below).

For instance, a respective representation of a respective position of a CPE related to an object may be determined as an identifier of the respective region linked to this object (for instance since the object is linked to this object because its related CPE is positioned within this region). Similarly, a respective representation of a respective position of a CAR related to an object may be determined as an identifier of at least one of the respective region(s) linked to this object (for instance as that region of the regions(s) linked to this object that contains the centre of the CAR (e.g. the centre of an elliptical coverage area model)).

In a step 904 of flowchart 900, the respective representations of the respective positions of the respective CARs/CPEs related to the group of objects determined in step 903 are then provided from server 3 to terminal 2 in step 904, and are received by terminal 2 in step 1002 of flowchart 1000 (see FIG. 10). Therein, if more than one CAR/CPE position representation is based on the same region, the identifier of this region may only provided once, and it may for instance be indicated by a list of objects associated with this single region identifier (for instance a list of objects following this single region identifier) which objects' CARs/CPEs are based on this single region identifier.

In embodiments of the invention, the introduction of the grid of regions as a basis for representing positions of CPEs/CARs provides opportunities for bit-savings in the transfer of radiomap information between server 3 and terminal 2 (see FIG. 1) in at least two manners.

Firstly, the grid-based approach becomes more efficient with increasing number of objects that have their respective CARs/CPEs represented by the same region. Assume for instance that there are two cell objects with CARs expressed as elliptical coverage area models having center points in a given region. Then this region is actually the common part for the coordinates of the two center points, which may be transferred as a single identifier of this region. If the resolution of the grid of regions is not sufficient to represent these two center points with a desired accuracy, then only the relative position of the center points within the region must be additionally described (which relative positions may have a smaller dynamic range than the absolute center position and thus may be represented by less bits). Otherwise, if the granularity/resolution of the grid of regions is considered sufficient with respect to a desired accuracy, then only identifiers of the region and the cell objects associated with it may have to be transferred. The quantization error is therefore at maximum the half of the diagonal of the region. Thus, the transfer scheme may confine itself to stating to which region the respective positions of the respective CARs/CPEs related to the objects belong and then, if required, express the respective CAR/CPE positions related to the objects relative to the region.

A second bit-saving opportunity lies in the optional dynamic resolution control within a region. Different types of objects may not require the same resolution for the coordinates (for instance, coordinates of the center point of an elliptical coverage area model, or coordinates of a CPE position). For instance, a CAR representing a country, an operator or an LAC may require much less resolution than for example a cell object or a WLAN object.

Hence, in embodiments of the invention, a mechanism to control the resolution of the coordinates is provided to save bits in the transfer of radiomap information between the server 3 and terminal 2 of system 1 (see FIG. 1).

This can for instance be accomplished by subdivision of a region into a plurality of sub-regions, and by addressing sub-regions of a region by Run-Length Encoding (RLE).

Figure 11:
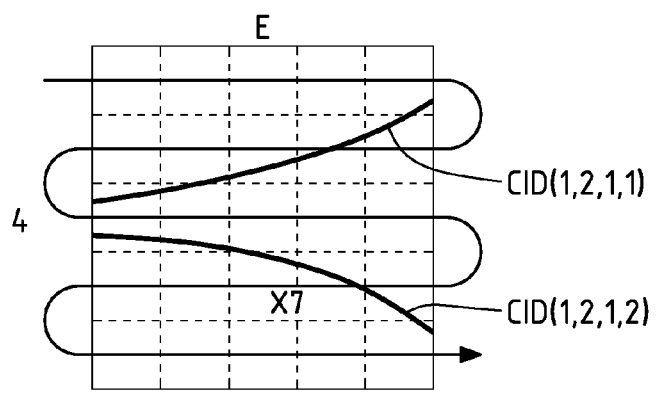
FIG. 11: a schematic presentation of region E4 of the lower part of FIG. 7 divided into subregions according to an embodiment of the invention.

As an example, FIG. 11 illustrates region E4 of the lower part of FIG. 7 divided into sub-regions as illustrated by the dashed grid according to an embodiment of the invention. The E4 region contains segments of cell objects CID(1,2,1, 1) and CID(1,2,1,2) and also WLAN object X7.

As a basis for RLE, it has to be expressed into how many sub-regions a region is divided. Furthermore, there has to be information or a convention how to "run through" the sub-regions, and furthermore information on the actual run-length.

In the example shown in FIG. 11, it would for instance first be indicated that the sub-grid divisor is five (5), meaning that region E4 will be divided into a 5×5 sub-grid of 25 sub-regions. Of course, also different divisors may be applied with respect to the two dimensions of a region, for instance a divisor of five with respect to one dimension, and a divisor of 4 with respect to the other dimension, yielding a 4×5 or 5×4 sub-grid of 20 sub-regions.

Then, region E4 includes one WLAN object "X7". Now, when the run-length through the sub-grid is determined, WLAN object "X7" may be indicated just by a number 17.

This indicates that when in the first sub-region, one must change region 17 times before arriving at the sub-region, in which WLAN object "X7" is located. As an alternative, WLAN object "X7" may also be indicated by a number 16, which would then indicates that, when in the first sub-region, one has to change the sub-region 16 times before arriving at the sub-region before the sub-region with the WLAN object. In this alternative, the size of the run-through indicator is thus reduced by one, which may allow saving the number of bits required for representing the run-through indicator. It is of course understood that there may exist further alternatives for defining the run-length through the sub-regions that may be applied if it is ensured that the applied definition of the run-length remains unambiguous. Note that so far one has only defined for "how long" one must run in the sub-grid. Note that one must also define the instructions "how to run" in the sub-grid. This is indicated by the arrow in FIG. 11. The instructions "how to run" through the sub-grid may be fixed, for instance independent of the sub-grid granularity, and may for instance not have to be transferred. It should be noted that the instructions illustrated in FIG. 11 only represent a non-limiting example. An alternative run-through instruction may for instance be to start in the top-left sub-region and then run through the sub-regions always from left to right (like in normal Western reading).

If there were additional objects, for instance a further WLAN object in sub-region 20, then the further object is described in the RLE relative to the earlier sub-region. Therefore, 20 could in fact here be indicated by 2 (since, when in sub-region 18 (where WLAN object "X7" is located), one has to change sub-regions two times to arrive in sub-region 20). This constitutes a further reduction of the number of bits required for encoding, since the dynamic range of the runlength required for the further objects is generally lower than the dynamic range of a runlength that starts from the first sub-region and thus requires less bits. Furthermore, it is to be noted that, similar to the case when no sub-regions are used, in case that the positions of CPEs/CARs of several objects are in the same region, also in case that a sub-grid is used to increase the resolution, transfer of an identifier of the region in which the positions of the CPEs/CARs are located is only required once for all of the several objects.

The sub-grid resolution may for instance be adjusted (for instance dynamically) based on the needs of the objects found in the region. This allows for saving bits in the radiomap transfer.

The sub-grid resolution may for instance be signalled together with each region identifier is refers to, and may thus for instance be valid for several objects that have positions of their CPEs/CARs in this region. It may also be the case that the respective sub-region divisors for the different object types are signalled from server 3 to terminal 2 when terminal 2 requests information on the radiomap from server 3 for the first time. Equally well, the respective sub-region divisors for the different object types may also be signalled by terminal 2 in a request to server 3. The respective sub-region divisors for the different object types may also be determined as a trade-off between accuracy and transfer costs, either by terminal 2 or server 3.

Example values for the sub-region size may be as follows:
Country, operator, LAC and RNC objects may not need a sub-region (i.e. sub-grid divisor=1). The maximum quantization error of $(\sqrt{2})5.6=7.9$ km (in case of 0.1 by 0.1 degree region size) may be acceptable for these objects.

Cell objects might suffice with a sub-grid divisor of 100 resulting in 111 by 111 meter sub-region size and $(\sqrt{2})56=79$ meter maximum quantization error. Note that the resolution might be further controlled based on the cell size. If the cell is an umbrella cell with a 35-km radius, then even a divisor of 10 leading to an 800-meter quantization error at maximum could be appropriate.

Finally, WLAN objects may need a divisor of, say, 500 resulting in 22 by 22 meter sub-regions and maximum quantization error of $(\sqrt{2})11=16$ m.

Note that the maximum quantization errors given above occur at the equator. Going north/south from the equator the maximum quantization error decreases.

It should be noted that the approach of embodiments of the invention to represent positions of CPEs/CARs based on regions (and optionally sub-regions) is basically independent of the approach of embodiments of the invention to associate objects of different CSs with each other based on common regions. Nevertheless, both approaches are of course combinable and may thus efficiently exploit that both approaches are based on linkage of objects to regions of the grid of regions. In this respect, step 505 of flowchart 500 of FIG. 5 may for instance comprise steps 903 and 904 of flowchart 900 of FIG. 9, i.e. the information on the determined objects of the first CS and the associated objects of the second CS may for instance comprise respective representations of respective positions of respective CPEs/CARs of the determined objects of the first CS and of the associated objects of the second CS, which representations are based on the regions (and optionally subregions) linked to these objects.

Embodiments of the invention also exploit linkage of objects to regions to identify objects that are associated with an area.

Figure 15:
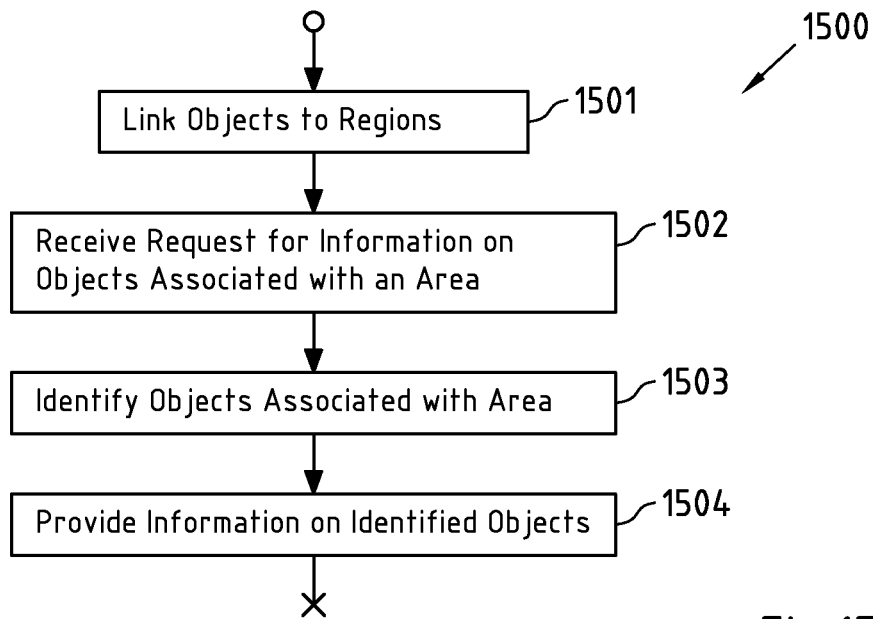
FIG. 15: a flowchart of a seventh embodiment of a method according to the invention performed by a server.
Figure 16:
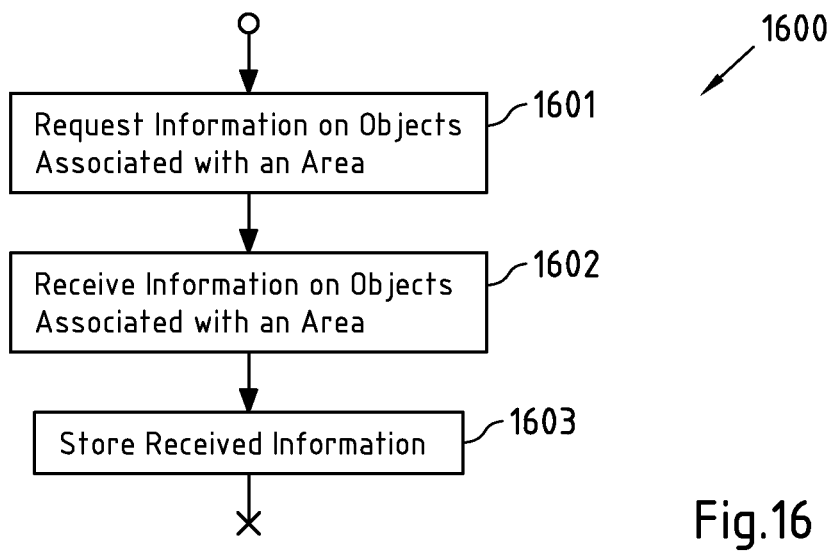
FIG. 16: a flowchart of an eighth embodiment of a method according to the invention performed by a terminal.

Accordingly, FIGS. 15 and 16 are complementary flow-charts 1500 and 1600 of seventh and eighth embodiments of a method according to the invention performed by server 3 of system 1 (see FIG. 1) and terminal 2, respectively.

In step 1501 of flowchart 1500 of FIG. 15, objects are linked to regions of a grid of region, for instance in the same way as in step 501 of flowchart 500 of FIG. 5.

In a step 1502, a request for information on objects associated with an area is received. Such a request is launched by terminal 2 in step 1601 of flowchart 1600 of FIG. 16. In this request, terminal 2 may for instance request all objects with respective CARs or CPE positions at least overlapping (or completely lying within) the area. The request may of course further specify which types of objects with respective CARs or CPE positions overlapping (or completely lying within) the area should be returned, for instance by using "include" and/or "exclude" lists as further discussed below. For instance, the request may specify a rectangular area (as an "area-based query") and may further specify what object types (for instance only WLAN objects, and/or only cell objects of a specific operator, etc.) shall be returned.

In a step 1503, those objects that are associated with the area (for instance have respective CARs or CPE positions at least overlapping with (or completely lying within) the area) are identified. This identification is based on the one or more regions that have been linked to each object in step 1501. For instance, in a first sub-step of step 1503, identifiers of all regions that are at least partially contained in the area are determined. Then, in a second sub-step of step 1503, it may be determined which objects (of the requested object type, if such a restriction was made in the request, or of all object types, if there is no such restriction) have been respectively linked in step 1501 to regions with identifiers that are among the determined identifiers. Objects with such identifiers are then considered to be identified as being associated with the region.

In step 1504, information (e.g. information on CARs and/or CPE positions) on the objects identified in step 1503 is then provided to a terminal 2, which receives this information in step 1602 of flowchart 1600 (see FIG. 16). Furthermore, in a step 1603 of flowchart 1600, this information is stored at terminal 2, for instance for later use in positioning.

It should be noted that the identification of objects that are associated with an area based on the regions that have been linked to objects may significantly contribute to save computational costs. Once the linkage between objects and regions has been accomplished, which may be required only once (and may be updated if a CAR/CPE position of an object changes), and if for instance simple geometric forms are chosen for the region and the area (for instance rectangular forms), checking if a region is within an area is much simpler as compared to a check if a respective CAR/CPE position related to an object is within the area. In particular, the computational savings of the region-based identification of objects may increase (as compared to the case where objects are identified based on determining intersections of their respective CAR/CPE positions with the area) when identification of objects with different area are requested frequently, since then the computational costs for the initial linkage between objects and regions pay off.

A further reduction in computational complexity may be achieved when the regions are indexed with identifiers. If the identifiers are for instance constructed in a way that for instance a first part thereof increases within the grid of regions from left to right and a second part thereof increases within the grid of regions from top to bottom, it may be easy to derive which regions are at least partially contained in the area. For instance, if the area is rectangular (and aligned with the grid of regions), it may be sufficient to determine the top-left region that is at least partially contained in the area and the bottom-right region that is at least partially contained in the area. The remaining regions may then be derived based on the indexing scheme. This yields a list of identifiers of regions that are at least partially contained in the area. It may then be checked based on these identifiers if there are objects associated with these regions.

It should be noted that the approach of embodiments of the invention to identify objects associated with an area based on regions is basically independent of the approach of embodiments of the invention to associate objects of different CSs with each other based on common regions. Nevertheless, both approaches are of course combinable and may thus efficiently exploit that both approaches are based on linkage of objects to regions of the grid of regions. For instance, in step 502 of flowchart 500 of FIG. 5, the request may not be formulated based on a LAC object of the first CS, but based on an area (e.g. a rectangular area) for which objects of the first and second CS are requested. The objects of the first CS that are associated with the area may then for instance be identified based on the regions, and then the objects of the second CS may be associated with these identified objects of the first CS based on common regions. Alternatively, of course also the objects of the second CS that are associated with the area may be identified based on the regions, and then the objects of the first CS may be associated with these identified objects of the second CS.

Embodiments of the invention further use an object version numbering that allows for simple and efficient tracking of updates/changes in a radiomap.

A global radiomap (database) with WLAN APs and Cell IDs is huge in terms of the data content. Up to now, there are approximately 6-7 million 2G/3G base stations and hundred million WLAN APs.

The database is necessarily dynamic—more CPEs are installed, taken out of use or removed. Also, depending on the algorithm for the database creation, the CARs (for instance in terms of size/shape) in the database may change rapidly as new measurement data (for instance from terminals reporting their current positions and currently heard CPEs) is obtained. Hence, the terminal may have to update its database every now and then.

Because of the large size of the database, the database preferably uses a suitable hierarchy and version control associated to it, which then together allow for efficient updates of the radiomap provided to the terminals using small/minimal computational resources and bandwidth.

Embodiments of the invention thus implement an object version control in the radiomap database, in which each object has a unique version number over the whole database. A new/updated object may then for instance get a version number that is one higher than the currently highest version number in the whole database. Where applicable, also the hierarchy of the radio network identifiers may be considered. In case that a change in the cell induces a change in, say, the area covered by an LAC, for instance the object versions of the cell and the LAC may be changed. Therein, the version number of the LAC may for instance also be changed whenever any cell in the LAC changes, i.e. the version number of the LAC may be changed irrespective of whether the model for the LAC itself changes. This may for instance allow a terminal to obtain only the new/updated objects by reporting the highest object version the terminal has in its memory. Alternatively, the terminal may for instance also obtain a full copy of the database, if the terminal wishes to flush the memory. This approach may for instance allow optimizing the amount of data transfer between server 3 (see FIG. 1), which contains or has access to the database, and terminal 2. Furthermore, this approach may also allow splitting data by adding an identifier of the database on front (or at any defined position) of the object version number.

Figure 12:
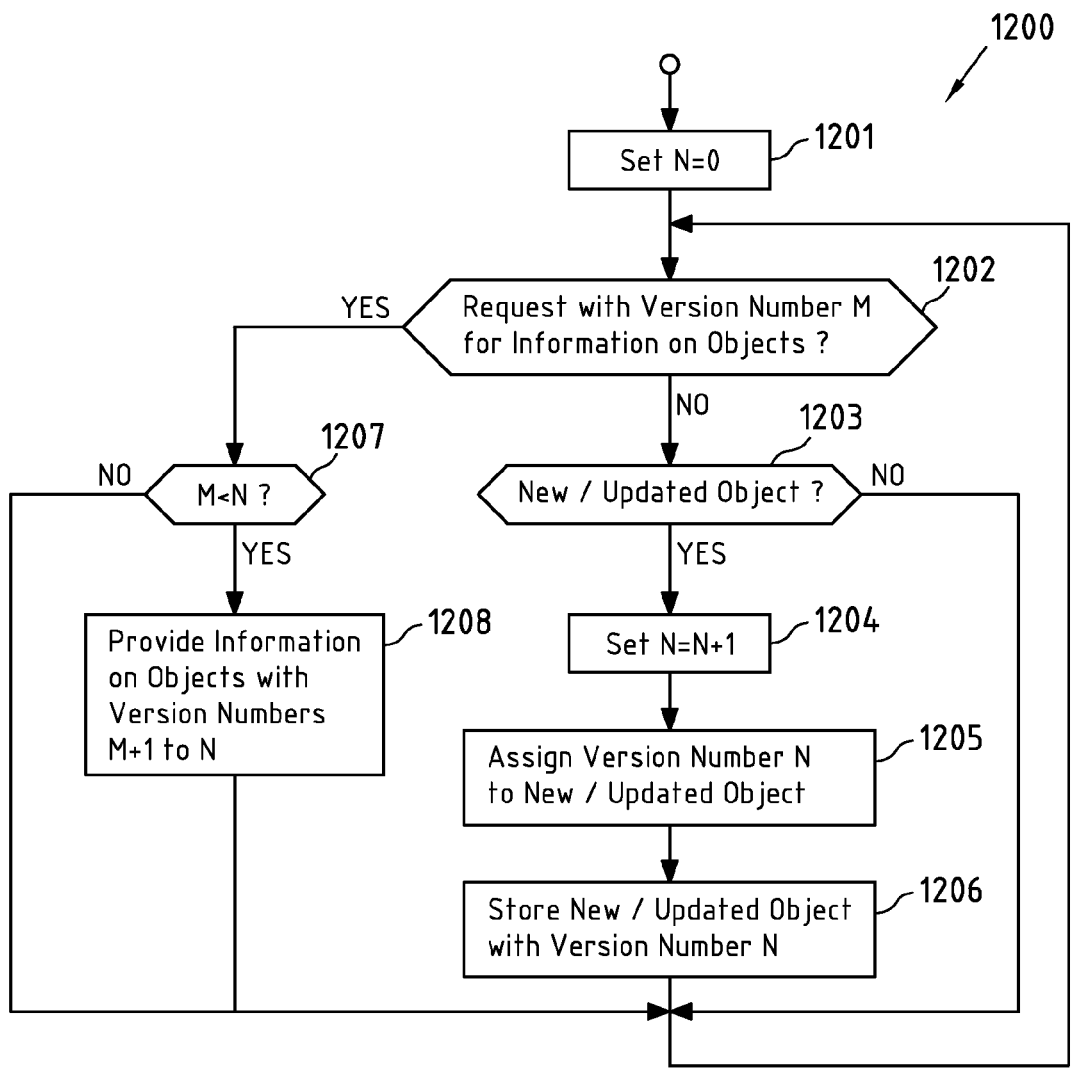
FIG. 12: a flowchart of a fifth embodiment of a method according to the invention performed by a server.

FIG. 12 is a flowchart 1200 of an according fifth embodiment of a method according to the invention. This flowchart may for instance be executed by server 3 of system 1 (see FIG. 1).

In a step 1201, a version number is initialized to zero. In step 1202, it is checked if a request for information on objects from the radiomap (database) has been received from terminal 2 at server 3 (cf. step 1305 of flowchart 1300 of FIG. 13). Such a request would contain a version number M representing the highest version number of an object received by terminal 2 from server 3 in response to a previous request. Alternatively, having the version number M in the request may be optional. Then, for instance if the database of terminal 2 is empty, not including the version number M into the request may indicate to server 3 that the database is empty. Requests having a version number M included may then be interpreted by server 3 in a way that only information on the objects that have been updated/added since the last delivery are requested by terminal 2.

If step 1202 yields a negative result, it is checked in step 1203 if any new object shall be created or if any object has to be updated (for instance due to changes in the CAR or CPE related to this object).

If this is the case, the version number is incremented by one (step 1204), the incremented version number is assigned to the new or updated object (step 1205), and the new or updated object is stored in the database with the incremented version number N (step 1206).

Then, and also in case step 1203 is negative, the flowchart jumps to step 1202 again.

If step 1202 is positive, it is checked in step 1207 if the version number M received in the request is smaller than the actual highest version number N in the database.

If this is the case, information on objects with version numbers M+1 to N is provided to terminal 2, and the flowchart jumps back to step 1202. Otherwise, the flowchart directly jumps back to step 1202.

It should be noted that the two processes of i) including new/updated objects into the database (steps 1201 and 1203-1206) and ii) providing objects in response to requests (steps 1202 and 1207-1208) have been merged into the common flowchart 1200 of FIG. 12 only for the sake of simplicity of presentation. Equally well, the flowchart steps pertaining to both processes could have been presented in separate flowcharts and may then for instance be executed by different threads of a processor or by different processors.

Figure 13:
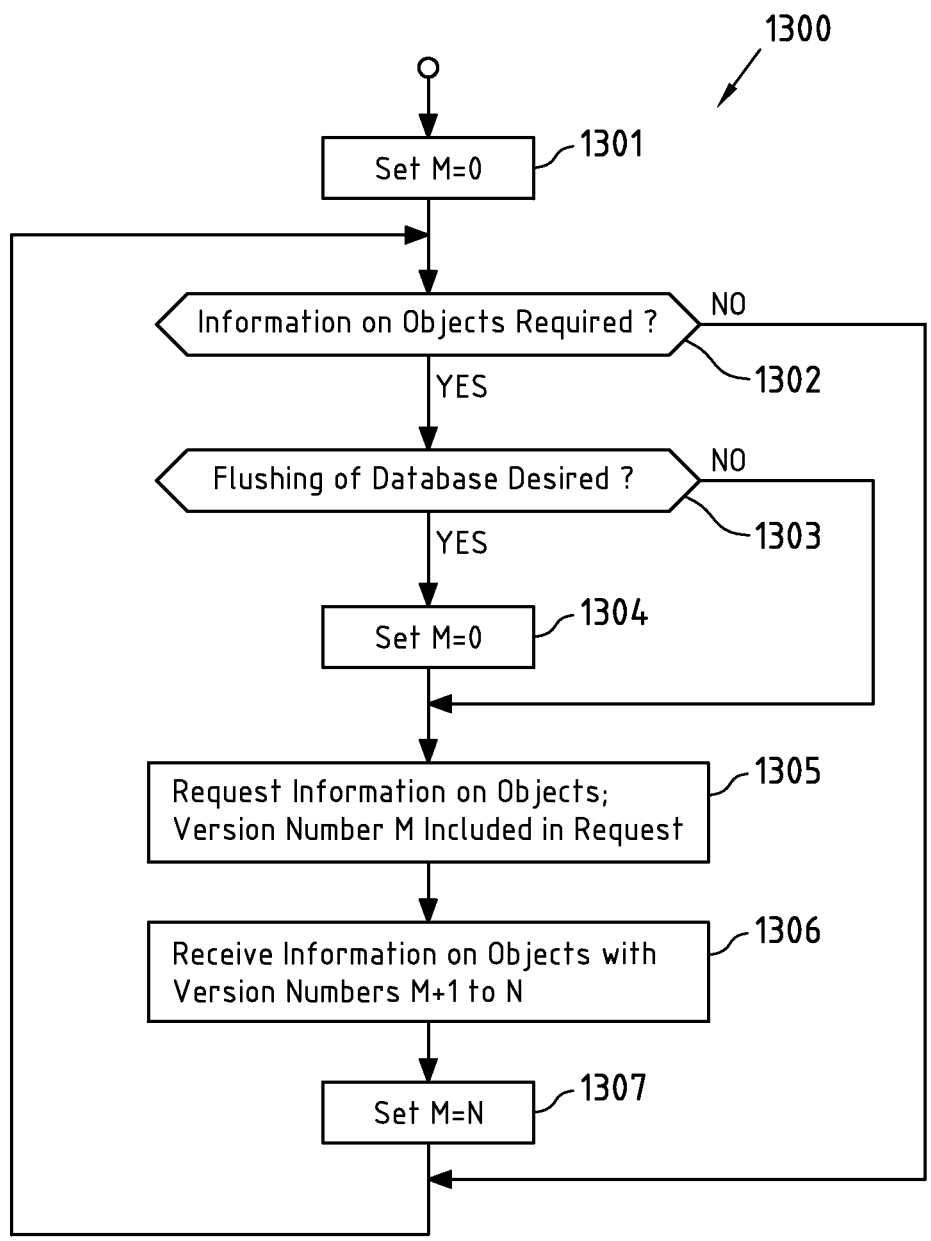
FIG. 13: a flowchart of a sixth embodiment of a method according to the invention performed by a terminal.

FIG. 13 is a flowchart 1300 of a sixth embodiment of a method according to the invention. This flowchart may for instance be executed by terminal 2 of system 1 (see FIG. 1) and complements flowchart 1200 of FIG. 12.

In a step 1301, a version number M is initialized to zero.

In a step 1302, it is then checked if information on objects from the radiomap (database) is required. This may for instance be the case if terminal 2 moves to a new area for which radiomap information is required for positioning purposes, or if terminal 2 has switched to a CS operated by a different operator for which so far no radiomap information is available at terminal 2, or if terminal 2 deduces that more time has passed from a previous update than allowed by a pre-determined threshold, or if terminal 2 deduces that it cannot find in its local database all the CPEs that terminal 2 hears, to name but a few non-limiting examples. Terminal 2 may thus deduce that the database it has is out-of-date and must be refreshed by launching a request to server 3.

Furthermore, terminal 2 may decide in step 1303 that flushing of the entire database is required, and may then set the version number M to zero in a step 1304.

In step 1305, a request for information on objects is sent from terminal 2 to server 3. This request also includes the version number M. As already stated above, inclusion of the version number M into the request may be optional. Lack of a version number M in the request may then be interpreted by server 3 in a way that terminal 2 has no previous database, and presence of a version number M in the request may indicate to server 3 that only a database update with the new/updated objects is desired by terminal 2.

The request sent in step 1305 may optionally comprise filter parameters that may for instance specify which (type of) objects are required. Additionally or alternatively, the request may comprise an exclude list indicating (type of) objects should not be provided to terminal 2. For instance, when terminal 2 requests objects for a certain area, it might define that it wishes neither to receive Cell objects nor WLAN objects. In case of a GSM CS, this may for instance limit the provision of objects to Country, Operator and LAC objects.

In response to this request, which is awaited in step 1202 of flowchart 1200 of FIG. 12 and accordingly processed in flowchart 1200, information on objects with version numbers M+1 to N is received in step 1306.

In step 1307, M is then set equal to N and thus reflects the highest version number of an object received from server 3 so far.

The flowchart then jumps back to step 1302.

It should be noted that, in embodiments of the invention, a server may ignore the version number M received in a request in step 1202, for instance in a situation where server 3 (instead of terminal 2) decides that the database of terminal 2 should be flushed. For instance, although terminal 2 tells the server that the terminal has the database with a version M=123135, server 3 may ignore this version number and flush the terminal's database by internally assuming M to be zero (for steps 1207 and 1208). The rationale for this server-induced flushing may for instance be maintenance issues, detected lack of synchronism between the database in server 3 and terminal 2, or the like.

The impact of the flowcharts 1200 and 1300 of FIGS. 12 and 13 will now be explained with reference to the examples of FIGS. 14a-14d.

Figure 14A:
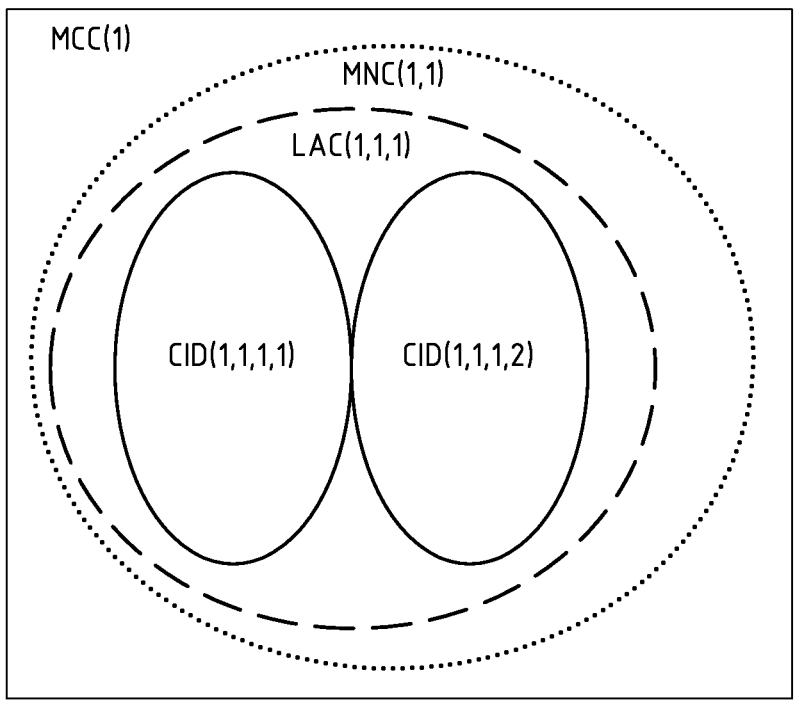
FIG. 14a: a schematic illustration of objects related to coverage areas.

FIG. 14a is an example situation in the radiomap at a given moment. FIG. 14a exemplarily shows the radiomap based on the GSM network hierarchy. The country code is "1" and the coverage model associated with the country is MCC(1). Likewise, operator code is "1" and because it's in the country "1", the operator object is denoted as MNC(1,1). The LAC is "1" and because it's in country "1" and operator is "1", the LAC object is denoted as LAC(1,1,1). Finally, the cell objects under the LAC object are denoted as CID(1,1,1,x). Because there are two cells, they are CID(1,1,1,1) and CID(1,1,1,2).

Figure 14B:
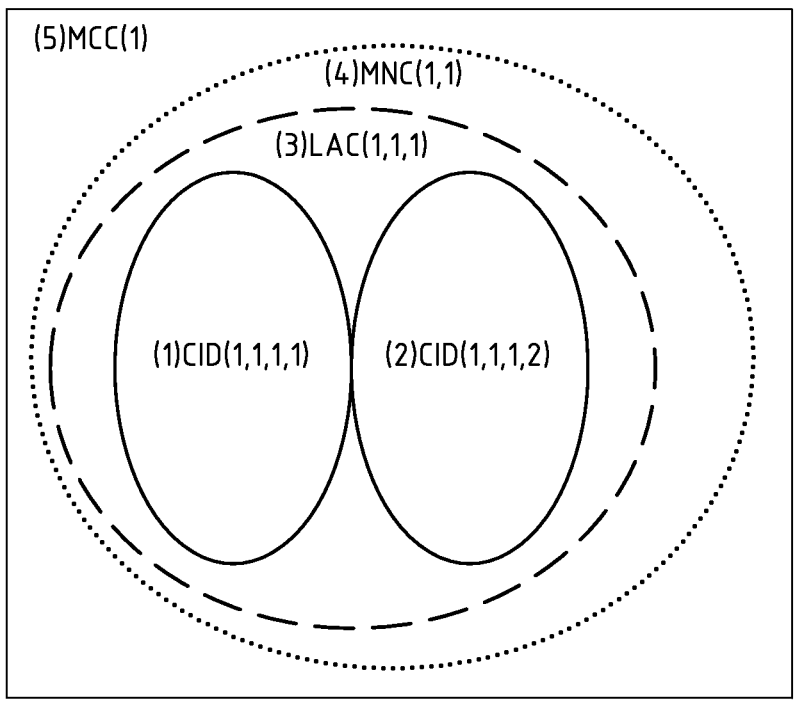
FIG. 14b: a schematic illustration of the objects of FIG. 14a with version numbers assigned according to an embodiment of the invention.

FIG. 14b basically corresponds to FIG. 14a, but now the object identifiers are supplemented by object version numbers. The object version number is given in brackets in front of the object identifier (e.g. the LAC(1,1,1) having the version number "3" is presented by (3)LAC(1,1,1)). Each object in the radiomap has a unique object version, i.e. in the database there are no objects having the same version.

Assume now that terminal 2 downloads this radiomap having "5" as the largest version number (see steps 1305 and 1306 of FIG. 13). It is now said that the radiomap in the terminal is version "5" (see step 1307 of FIG. 13).

Figure 14C:
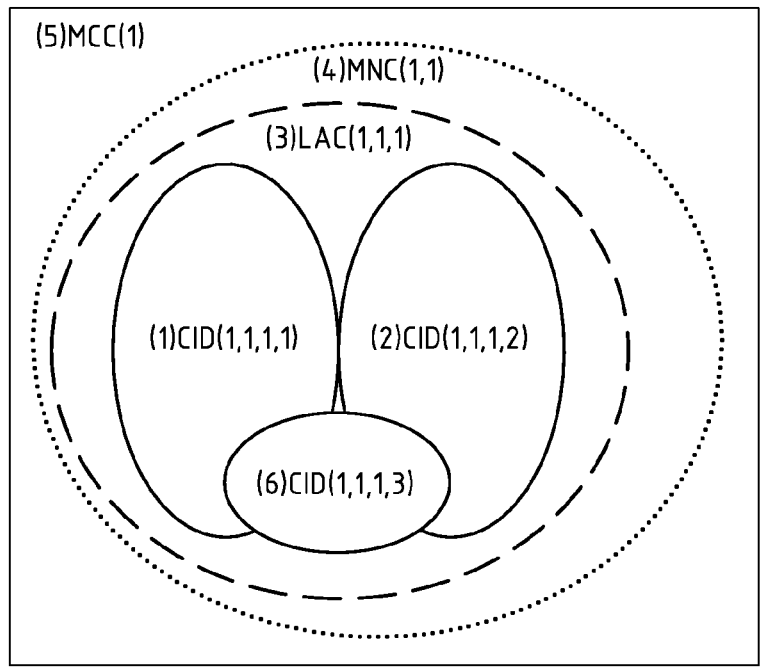
FIG. 14c: a schematic illustration of the objects of FIG. 14b when a further object is added according to an embodiment of the invention.

In FIG. 14c, a new cell object, CID(1,1,1,3), has appeared within the LAC(1,1,1). Now the new cell object is given the version number that equals the highest version number of the previous database (shown in FIG. 14b), i.e. "5", plus one. Hence, the new cell object obtains the version number "6". The cell object is therefore presented by notation (6)CID(1,1,1,3).

Assume now that terminal 2 connects to the radiomap server 3 for updates. In the request, the terminal reports that it already has the version "5" of the radiomap (see step 1305 of FIG. 13). Now, server 3 only needs to send terminal 2 those objects having a version number greater than "5" (see step 1207 of FIG. 12). Therefore, only (6)CID(1,1,1,3) gets sent to terminal 2 (see step 1208 of FIG. 12).

Figure 14D:
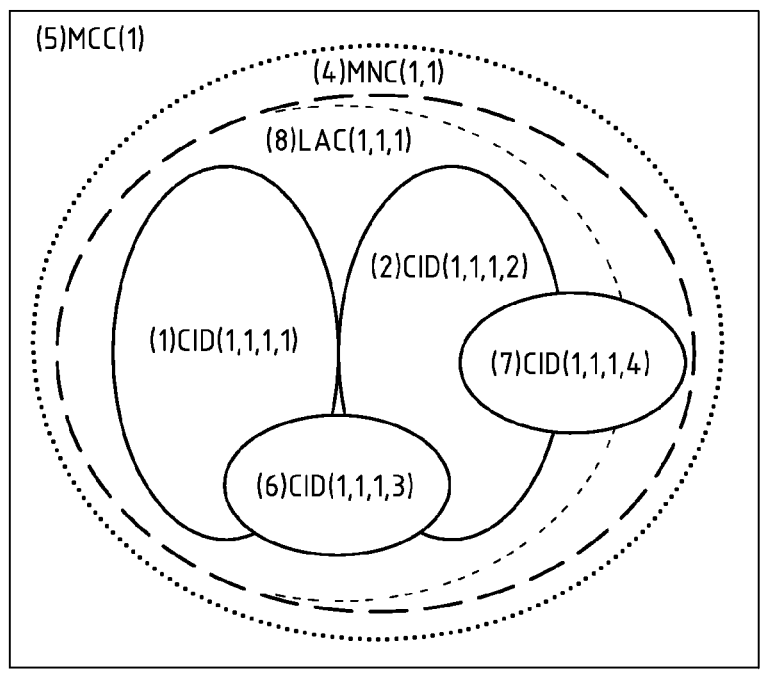
FIG. 14d: a schematic illustration of the objects of FIG. 14c when a further object that changes a hierarchically higher object is added according to an embodiment of the invention.

Now, in FIG. 14d there is a further new cell object, CID(1,1,1,4). Because in the previous radiomap, the greatest object version was "6", the new cell obtains version "7", i.e. (7)CID(1,1,1,4). However, the new cell object extended the area covered by the LAC object to which CID(1,1,1,4) belongs. Therefore, the coverage area model for the LAC (1,1,1) changes as well (as indicated by the bold-face dashed ellipse). It naturally obtains the version "8", i.e. (3)LAC(1,1,1) changes to (8)LAC(1,1,1). This shows how the cellular network hierarchy is closely associated with the version control.

Now, assume again that terminal 2 connects to server 3 to retrieve an updated radiomap. Terminal 2 reports that it already has in the memory a radiomap version "6" (see step 1305 of FIG. 13). Server 3 then only may have to send terminal 2 objects with a version number greater than "6" (see step 1207 of FIG. 12). Therefore, terminal 2 is only provided with information on the cell object (7)CID(1,1,1,4) and the LAC object (8)LAC(1,1,1) (see step 1208 of FIG. 12 and step 1306 of FIG. 13).

The following notes are in place:

The above-described version control can be extended to any objects. For instance, WLAN objects are handled similarly, and in case of, say, several operators, nothing changes. Each unique object has a unique version number.

The example of FIGS. 14a-14d above dealt with a cellular CS, where a new cell object caused a change in the LAC object as well (FIG. 14d). In the case of objects without hierarchy, e.g. WLAN objects, the update of an object may not trigger changes in any other objects.

If a terminal wishes to download the complete radiomap (i.e. flush it's local database), then it may be agreed that the terminal reports that it has the version "( )" of the database in the memory (see steps 1303 and 1304 of FIG. 13). The server then interprets this so that a complete copy of the radiomap shall be sent to the terminal. If reporting of the database version is optional, the missing version number may be interpreted at server 3 as empty database in terminal 2, resulting in server 3 sending all the requested objects (irrespective of their version number) to the terminal.

Instead of always increasing the up-to-then highest version number to obtain a version number for a new/updated object, also always an up-to-then lowest version number could be decreased to obtain a version number for a new/updated object (initialization would then for instance take place with the largest possible version number instead of the smallest possible version number).

In addition to filtering based on version numbers as described above, there may be additional filters associated with the radiomap download.

For instance, a request (see step 1305 of FIG. 13) may comprise an "include" list, which indicates the types of objects (and optionally attribute values) that should be provided to terminal 2. Additionally or alternatively, a request (see step 1305 of FIG. 13) may comprise an "exclude" list, which indicates the types of objects (and optionally attribute values) that should not be provided to terminal 2.

For example, consider a situation that a terminal has the version "6" of the radiomap, but the radiomap in the server has been updated to the situation shown in figure FIG. 14d. When the terminal connects to the server, the terminal might indicate that it has the version "6" of the radiomap, but it only wishes to retrieve cell objects. Then only (7)CID(1,1,1,4) would be sent to the terminal, but not LAC object (8)LAC(1,1,1). The terminal might do this just to save data costs, because cell-based positioning may be superior to LAC-based positioning (for instance since a cell has a significantly smaller area as compared to an LAC). Nevertheless, LAC-based positioning may be used as a backup for cell-based positioning in case there is a CAR for the LAC, in which the terminal is in, but not for the serving cell (this might for instance happen in the case of a new cell).

As a further example, assume that terminal 2 has GSM and WLAN capabilities (but not WCDMA/LTE capabilities). Using the "include" list or a "query" parameter in its request to server 3, terminal 2 may for instance request objects for a certain area. This criterion would return all the objects (WLAN/GSM/WCDMA/LTE) in the area. Now, using the "exclude" list, terminal 2 can exclude WCDMA and LTE objects from the delivery.

Advantages of the version numbering approach of embodiments of the invention thus include a particularly simple version control scheme in the server side, where an object, no matter whether it is updated or just created, gets the version number that is then the highest in the radiomap. This may for instance allow for efficient filtering of objects based on the version number, and may for instance result in data transfer optimization. In contrast, an alternative approach of using time stamps in this type of synchronization may introduce time synchronization problems between servers and terminals, especially when there are several instances of databases.

It should be noted that the version numbering approach of embodiments of the invention is basically independent of the approach of embodiments of the invention to associate objects of different CSs with each other based on common regions, and/or of the approach of embodiments of the invention to represent positions of CPEs/CARs related to objects based on regions (and optionally sub-regions) linked to the objects, and/or of the approach of embodiments of the invention to identify objects that are associated with an area based on regions. Nevertheless, the version numbering approach is of course advantageously useable in the databases on which the other three approaches operate. For instance, if server 3 (see FIG. 1) keeps separate databases for, say objects of cellular CS(s) and objects of non-cellular CS(s), and also applies separate version numbering in these databases, an update request sent from terminal 2 to the server 3 requesting information on updates with respect to the cellular objects, and for instance used an LAC as a further filtering criterion to reduce the amount of the update data, nevertheless an association between the updated/new objects of the cellular CS and the also desired objects of the non-cellular CS is required, which can be accomplished based on the region-based adaptation layer. As a further example, when update information is provided from server 3 to terminal 2 based on comparison of version numbers, representations of positions of CPEs/CARs related to objects contained in this update information may be based on regions (and optionally sub-regions) linked to these objects. Similarly, an update request may be restricted to the objects associated with a certain area, which objects may then be identified based on regions that have been assigned to these objects.

As used in this application, the term 'circuitry' refers to all of the following:
(a) hardware-only circuit implementations (such as implementations in only analog and/or digital circuitry) and
(b) combinations of circuits and software (and/or firmware), such as (as applicable):
(i) to a combination of processor(s) or
(ii) to portions of processor (s)/software (including digital signal processor(s)), software, and memory(ies) that work together to cause an apparatus, such as a mobile phone or a positioning device, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a positioning device.

The invention has been described above by means of embodiments, which shall be understood to be non-limiting examples. In particular, it should be noted that there are alternative ways and variations which are obvious to a skilled person in the art and can be implemented without deviating from the scope and spirit of the appended claims. It should be noted that the concepts of the present invention described with respect to the flowcharts of FIGS. 5/6, 9/10, 12/13 and 15/16 should basically be considered to be disclosed independent of each other, but also in all possible combinations of two or more of them. It should also be understood that the sequence of method steps in the flowcharts presented above is not mandatory, also alternative sequences may be possible.

The invention claimed is:

1. A method comprising:
respectively linking, by a server, at least two objects of a plurality of objects to one or more respective geographic regions of a grid of contiguous non-overlapping geographic regions, wherein said at least two objects respectively serve to identify at least one of a respective coverage area representation or a respective coverage-providing entity;
receiving, at the server, a request from a mobile terminal for information on objects relating to a plurality of communication systems whose signals are heard by the mobile terminal;
the signals heard by the mobile terminal including signals in a first communication system comprising information on a first object of the at least two objects, the first object characteristic of the first communication system, the signals comprising the information on the first object being heard by the mobile terminal scanning or sniffing one or more signals broadcast by a first coverage-providing entity, the first object serving to identify the first coverage providing entity;
the signals heard by the mobile terminal further including signals in a second communication system comprising information on a second object of the at least two objects, the second object characteristic of the second communication system, the signals comprising the information on the second object being heard by the mobile terminal scanning or sniffing one or more signals broadcast by a second coverage-providing entity, the second object serving to identify the second coverage providing entity;
the request received by the server comprising at least information on the first object characteristic of the first communication system and information on the second object characteristic of the second communication system;
associating, by the server, in response to said request, at least the first and second objects with each other based on a finding that both the first object characteristic of the first communication system and the second object characteristic of the second communication system have been linked to at least one same geographic region of said grid of contiguous non-overlapping geographic regions, wherein the second communication system that is at least one of different from or operated by another operator than said first communication system; and transmitting, by the server to the mobile terminal, information on the at least one same geographic region of said grid of contiguous non-overlapping geographic regions, in response to finding that both the first object characteristic of the first communication system and the second object characteristic of the second communication system have been linked to the at least one same geographic region.

2. The method according to claim 1, further comprising: providing, to the mobile terminal, for at least one of said at least two objects that have been respectively linked to said one or more respective geographic regions of said grid of contiguous non-overlapping geographic regions, a respective representation of a respective position of said at least one of a respective coverage area representation or a respective coverage-providing entity which said at least one object respectively serves to identify, and wherein said respective representation of said respective position is respectively based on at least one of said one or more respective geographic regions respectively linked to said at least one object.

3. The method of claim 1, wherein each of said at least two objects is at least one of a country code, an operator code, a network code, a local area code, a radio network controller, a cell identifier or a short-range wireless access point address.

4. A non-transitory computer-readable medium having a computer program stored thereon, the computer program comprising program code for performing the method according to claim 1 when said computer program is executed on a processor.

5. A method comprising:
transmitting, by a mobile terminal, a request for information on objects relating to a plurality of communication systems whose signals are heard by the mobile terminal;
the signals heard by the mobile terminal including signals in a first communication system comprising information on a first object characteristic of the first communication system, the signals comprising the information on the first object being heard by the mobile terminal scanning or sniffing one or more signals broadcast by a first coverage-providing entity, the first object serving to identify the first coverage providing entity;
the signals heard by the mobile terminal further including signals in a second communication system comprising information on a second object characteristic of the second communication system, the signals comprising the information on the second object being heard by the mobile terminal scanning or sniffing one or more signals broadcast by a second coverage-providing entity, the second object serving to identify the second coverage providing entity;
the request transmitted by the mobile terminal comprising at least information on the first object characteristic of the first communication system and information on the second object characteristic of the second communication system; and
receiving, at the mobile terminal, information on at least the first and second objects obtained by respectively linking at least the first and second objects of a plurality of objects to one or more respective geographic regions of a grid of contiguous non-overlapping geographic regions and by associating at least the first and second objects with each other based on a finding that both the first object characteristic of the first communication system and the second object characteristic of the second communication system have been linked to at least one same geographic region of a grid of contiguous non-overlapping geographic regions, wherein said at least the first and second objects respectively serve to identify at least one of a respective coverage area representation or a respective coverage-providing entity, and wherein the second communication system that is at least one of different from or operated by another operator than said first communication system.

6. The method according to claim 5, further comprising:
receiving, for at least one of said at least two objects that have been respectively linked to said one or more respective geographic regions of said grid of contiguous non-overlapping geographic regions, a respective representation of a respective position of said at least one of a respective coverage area representation or a respective coverage-providing entity which said at least one object respectively serves to identify, wherein said respective representation of said respective position is respectively based on at least one of said one or more respective geographic regions respectively linked to said at least one object.

7. A non-transitory computer-readable medium having a computer program stored thereon, the computer program comprising program code for performing the method according to claim 6 when said computer program is executed on a processor.

8. An apparatus, comprising at least one processor; and at least one memory including computer program code, said at least one memory and said computer program code configured to, with said at least one processor, cause said apparatus at least to
respectively link at least two objects of a plurality of objects to one or more respective geographic regions of a grid of contiguous non-overlapping geographic regions, wherein said at least two objects respectively serve to identify at least one of a respective coverage area representation or a respective coverage-providing entity;
receive, from a mobile terminal, a request for information on objects relating to a plurality of communication systems whose signals are heard by the mobile terminal;
the signals heard by the mobile terminal including signals in a first communication system comprising information on a first object of the at least two objects, the first object characteristic of the first communication system, the signals comprising the information on the first object being heard by the mobile terminal scanning or sniffing one or more signals broadcast by a first coverage-providing entity, the first object serving to identify the first coverage providing entity;
the signals heard by the mobile terminal further including signals in a second communication system comprising information on a second object of the at least two objects, the second object characteristic of the second communication system, the signals comprising the information on the second object being heard by the mobile terminal scanning or sniffing one or more signals broadcast by a second coverage-providing entity, the second object serving to identify the second coverage providing entity;
the request received from the mobile terminal comprising at least information on the first object characteristic of the first communication system and information on the second object characteristic of the second communication system;

associate, in response to said request, at least the first and second objects with each other based on a finding that both the first object characteristic of the first communication system and the second object characteristic of the second communication system have been linked to at least one same geographic region of said grid of contiguous non-overlapping geographic regions, wherein the second communication system that is at least one of different from or operated by another operator than said first communication system; and transmit to the mobile terminal, information on the at least one same geographic region of said grid of contiguous non-overlapping geographic regions, in response to finding that both the first object characteristic of the first communication system and the second object characteristic of the second communication system have been linked to the at least one same geographic region.

9. The apparatus according to claim 8, wherein said at least one memory and said computer program code are configured to, with said at least one processor, cause said apparatus further to provide, for at least one of said at least two objects that have been respectively linked to said one or more respective geographic regions of said grid of contiguous non-overlapping geographic regions, a respective representation of a respective position of said at least one of a respective coverage area representation or a respective coverage-providing entity which said at least one object respectively serves to identify, and wherein said respective representation of said respective position is respectively based on at least one of said one or more respective geographic regions respectively linked to said at least one object.

10. The apparatus according to claim 9, wherein said respective representation of said respective position is further respectively based on a respective sub-region obtained by subdivision of at least one of said one or more respective geographic regions respectively linked to said at least one object.

11. The apparatus according to claim 10, wherein said respective subdivision is adjusted in dependence on a respective desired resolution of said respective representation of said respective position.

12. The apparatus according to claim 10, wherein run-length coding is used to indicate said respective sub-region based on which said respective representation of said respective position is further respectively based.

13. The apparatus according to claim 12, wherein in case that respective representations of respective positions for at least two of said at least two objects that have been respectively linked to said one or more respective geographic regions of said grid of contiguous non-overlapping geographic regions are based on respective sub-regions in a same geographic region of said grid of contiguous non-overlapping geographic regions, for at least one of said at least two objects, said run-length coding refers to a sub-region related to a representation of a position for at least one other object of said at least two objects.

14. The apparatus according to claim 8, wherein at least one of said at least two associated objects is identified as being associated with an area based on a finding that at least one of said one or more respective geographic regions that have been linked to said at least one object is at least partially contained in said area.

15. The apparatus according to claim 14, wherein said at least one object is identified by at least one of:

determining one or more geographic regions of said grid of contiguous non-overlapping geographic regions that are at least partially contained in said area, and identifying said at least one object as an object that has been linked to at least one of said one or more determined geographic regions; and determining a list of respective identifiers of one or more geographic regions of said grid of contiguous non-overlapping geographic regions that are at least partially contained in said area, and identifying said at least one object as an object that has been linked to a geographic region with an identifier comprised in said list of identifiers.

16. The apparatus according to claim 8, wherein each object of said plurality of objects is stored in a database and has a respective version number that is unique within said database and is obtained by increasing a respective up-to-then highest version number in said database when said object is one of updated and newly added and by assigning said increased version number to said object.

17. The apparatus according to claim 16, wherein at least one of an update or an addition of an object may also be considered as an update of a hierarchically higher object, so that a new version number is also assigned to said hierarchically higher object.

18. The apparatus according to claim 8, wherein said first communication system is a cellular radio system, and wherein said second communication system is a non-cellular radio communication.

19. The apparatus according to claim 8, wherein an object of said at least two objects is linked to a geographic region of said grid of contiguous non-overlapping geographic regions in at least one of the cases that a coverage area representation which said object identifies at least partially overlays said geographic region or that a coverage-providing entity which said object identifies is at least partially located in said geographic region.

20. An apparatus comprising at least one processor; and at least one memory including computer program code, said at least one memory and said computer program code configured to, with said at least one processor, cause said apparatus at least to transmit a request for information on objects relating to a plurality of communication systems whose signals are heard by the apparatus;

the signals heard by the apparatus including signals in a first communication system comprising information on a first object characteristic of the first communication system, the signals comprising the information on the first object being heard by the apparatus scanning or sniffing one or more signals broadcast by a first coverage-providing entity, the first object serving to identify the first coverage providing entity;

the signals heard by the apparatus further including signals in a second communication system comprising information on a second object characteristic of the second communication system, the signals comprising the information on the second object being heard by the apparatus scanning or sniffing one or more signals broadcast by a second coverage-providing entity, the second object serving to identify the second coverage providing entity;

the request transmitted by the apparatus comprising at least information on the first object characteristic of the first communication system and information on the second object characteristic of the second communication system; and receive information on at least the first and second objects obtained by respectively linking at least the first and second objects of a plurality of objects to one or more respective geographic regions of a grid of contiguous non-overlapping geographic regions and by associating at least the first and second objects with each other based on a finding that both the first object characteristic of the first communication system and the second object characteristic of the second communication system have been linked to at least one same geographic region of a grid of contiguous non-overlapping geographic regions, wherein said at least the first and second objects respectively serve to identify at least one of a respective coverage area representation or a respective coverage-providing entity, and wherein the second communication system that is at least one of different from or operated by another operator than said first communication system.

21. The apparatus according to claim 20, wherein said at least one memory and said computer program code are configured to, with said at least one processor, cause said apparatus further to receive, for at least one of said at least two objects that have been respectively linked to said one or more respective geographic regions of said grid of contiguous non-overlapping geographic regions, a respective representation of a respective position of said at least one of a respective coverage area representation or a respective coverage-providing entity which said at least one object respectively serves to identify, wherein said respective representation of said respective position is respectively based on at least one of said one or more respective geographic regions respectively linked to said at least one object.

* * * * *